United States Patent [19]

Taniguchi et al.

[11] Patent Number: 5,619,347
[45] Date of Patent: Apr. 8, 1997

[54] APPARATUS FOR CALCULATING A DEGREE OF WHITE BALANCE ADJUSTMENT FOR A PICTURE

[75] Inventors: Kouji Taniguchi; Katsuhiro Kanamori, both of Kawasaki, Japan

[73] Assignee: Matsushita Electric Industrial Co., Ltd., Osaka, Japan

[21] Appl. No.: 533,731

[22] Filed: Sep. 26, 1995

[30] Foreign Application Priority Data

Sep. 28, 1994 [JP] Japan .................................. 6-233831

[51] Int. Cl.$^6$ .................................................. H04N 9/73
[52] U.S. Cl. ........................................... 358/516; 348/223
[58] Field of Search ................................... 348/223, 235, 348/655; 358/516–518

[56] References Cited

U.S. PATENT DOCUMENTS

| | | | |
|---|---|---|---|
| 4,954,884 | 9/1990 | Nakayama et al. | 348/235 |
| 5,223,921 | 6/1993 | Haruki et al. | 348/223 |
| 5,327,226 | 7/1994 | Tanabe | 348/223 |
| 5,389,969 | 2/1995 | Suzuki et al. | 348/223 |

FOREIGN PATENT DOCUMENTS

| | | |
|---|---|---|
| 2-28869 | 11/1990 | Japan . |
| 2-298194 | 12/1990 | Japan . |
| 3-250992 | 11/1991 | Japan . |
| 3-274884 | 12/1991 | Japan . |
| 4-323994 | 11/1992 | Japan . |
| 5-191825 | 7/1993 | Japan . |

*Primary Examiner*—Stephen Brinich
*Attorney, Agent, or Firm*—Lowe, Price, LeBlanc & Becker

[57] ABSTRACT

Pieces of white balance information indicating color features of a colored picture or picture blocks obtained by partitioning the colored picture are extracted from piece of picture data of the colored picture in an extracting unit. Whether or not a white region exist in the colored picture is judged in a white region judging unit according to the white balance information indicating the color features of the colored picture. When the existence of the white region is judged, a white balance coefficient is calculated in a white balance calculating unit to make the white region white. In contrast, when no existence of any white region is judged, a color distribution axis extending from an original point of a color space to a gravity center of the white balance information indicating the color features of the picture blocks from which pieces of white balance information corresponding to picture blocks of a high chromatic color or a uniform chromaticity are removed is detected in a color distribution axis detecting unit, and the white balance coefficient is calculated to set the color distribution axis to an achromatic color axis of the color space. Therefore, a white balance adjustment adapted to color features of each of colored pictures can be performed.

21 Claims, 10 Drawing Sheets

$$\theta = \frac{180}{\pi} \times ATAN\left(\frac{r_2}{g_6}\right)$$

APPARATUS FOR CALCULATING A DEGREE OF WHITE BALANCE ADJUSTMENT FOR A PICTURE

BACKGROUND OF THE INVENTION

1. Field of the Invention

The present invention relates generally to an apparatus for calculating a degree of white balance adjustment for a picture, and more particularly to an apparatus for calculating a degree of white balance adjustment for a picture which is used for a color image outputting apparatus such as a color video printer, a color copy machine or the like and is appropriate to perform a hard-copy of a picture.

2. Description of the Related Art

In many types of video cameras and video movies, an auto white balance adjustment function is provided, and the white balance adjustment is performed on the assumption that an integrated value (or an average value) of color difference signals for a picture in which an appropriate white balance is kept becomes zero. However, in cases where a chromatic-colored object is pictured to occupy a wide region of the picture, the assumption is not necessarily correct. Therefore, when the auto white balance adjustment is performed, a picture quality often deteriorates. For example, a picture adjusted in auto white balance is faded.

2.1. Previously Proposed Art

To solve this problem, many auto white balance adjusting methods in which many types of improvement are performed are developed and disclosed. For example, in an adjusting method disclosed in the Published Unexamined Japanese Patent Application No. H3-274884 (274884/1991), a plurality of color difference signals of pixels which have colors near to white and are placed in a rectangular region along a black-body radiation curve in a color space are integrated to perform the white balance adjustment. Also, in an adjusting method disclosed in the Published Unexamined Japanese Patent Application No. H3-250992 (250992/1991), a photographed picture is partitioned into 8×8 regions, an integrated value of color difference signals for each of the regions is estimated, and the adverse influence of a high chromatic-colored object pictured in a region on a white balance adjustment for all regions of the photographed picture is reduced. However, these types of improvement are not sufficient to perform the auto white balance adjustment with high accuracy without any deterioration of picture quality.

Also, a picture quality of an image printed by a video printer is influenced by the quality of picture signals input to a television, a video tape recorder, a laser disk, a video movie or the like. Therefore, it is required to consider that the picture signals in which any white balance adjustment is not performed because of a manual photographing are reproduced by the video printer. Even though the auto white balance adjustment is performed for the picture signals in a photographing apparatus, the picture signals in which the auto white balance adjustment is not sufficient or is erroneously performed are reproduced by the video printer. Therefore, the auto white balance adjustment sufficiently performed with high accuracy is required of a color image outputting apparatus.

2.2. Problems to be Solved by the Invention

A conventional video printer having an auto white balance function is disclosed in the Published Unexamined Japanese Patent Application No. H2-298194 (298194/1990). In this Application, a degree of white balance adjustment is calculated on the basis of an integrated value of color difference signals, in the same manner as that in the white balance adjusting method for the video camera. However, there is a problem that the white valance adjustment is erroneously performed because of the existence of a high chromatic object in the same manner as the white balance adjustment in the video camera.

Also, in the Published Unexamined Japanese Patent Application No. H4-323994 (323994/1992), a chromaticity threshold is used to remove pixels relating to a high chromaticity and to select pixels relating to low chromaticity for the purpose of avoiding adverse influence of the high chromaticity, and the white balance adjustment is performed by using information relating to the low chromaticity. However, in cases where the white balance is not kept in a picture, an achromatic color used as a basis of chromatic colors cannot be defined, and chromaticity cannot be determined with high reliability. That is, an appropriate white balance adjustment cannot be necessarily performed.

Therefore, in cases where the white balance adjustment is performed on the basis of an integrated value of color difference signals, it is important how the adverse influence of a high chromaticity region in a picture is removed to calculate a degree of white balance adjustment without any erroneous adjustment.

Also, in cases where a white region slightly colored exists in a picture, it is preferred that the white balance adjustment be not performed on the basis of an integrated value of color difference signals but the white balance adjustment be performed on the basis of the white region.

Accordingly, it is preferred that the white balance adjustment based on an integrated value of color difference signals or the white balance adjustment based on a white region detected be selected by considering features of a color distribution of a picture.

SUMMARY OF THE INVENTION

An object of the present invention is to provide, with due consideration to the drawbacks of such a conventional apparatus for calculating a degree of white balance adjustment, an apparatus for calculating a degree of white balance adjustment for a picture in which a white balance adjustment appropriate to a colored picture reproduced by a colored picture outputting apparatus such as a video printer is selectively performed without any erroneous adjustment and the adverse influence of a high chromaticity region of the colored picture is hardly received.

The object is achieved by the provision of an apparatus for calculating a degree of white balance adjustment for a picture, comprising:

white balance information extracting means for partitioning a colored picture into a plurality of picture blocks respectively having an uniform size and extracting one or more pieces of white balance information, which each indicate one or more color features of one picture block or one or more color features of the colored picture, from pieces of picture data corresponding to pixels of the colored picture;

white region judging and detecting means for judging whether or not a white region having a low chromaticity exists in one of the picture blocks according to the white balance information extracted in the white balance information extracting means and detecting the white region as a basis of white in a white balance adjustment for the colored picture in cases where the white region exists in one of the picture blocks;

color distribution axis detecting means for detecting a color distribution axis extending from an original point of a three-dimensional color space to a gravity center of a color distribution of the colored picture according to the white balance information extracted in the white balance information extracting means;

white balance coefficient calculating means for calculating a white balance coefficient denoting an amplification gain for colors of pixels of the colored picture according to a color of the white region detected in the white region judging and detecting means in cases where it is judged that the white region exists in one of the picture blocks or according to the color distribution axis detected in the color distribution axis detecting means, the white balance coefficient varying around 1.0; and relaxation factor calculating means for calculating a relaxation factor to relax the influence of the color distribution axis detected in the color distribution axis detecting means on the white balance coefficient calculated in the white balance coefficient calculating means, a difference between the white balance coefficient and 1.0 being reduced according to the relaxation factor.

In the above configuration, pieces of white balance information indicating color features of each picture block or color features of a colored picture are extracted from pieces of picture data in the white balance information extracting means.

Thereafter, it is judged in the white region judging and detecting means whether or not a white region having a low chromaticity exists in one of the picture blocks according to the white balance information. In cases where the white region exists in one picture block, a white balance coefficient is calculated in the white balance coefficient calculating means according to a color of the white region. The white balance coefficient calculated functions as an amplification gain for pixels of the colored picture.

Therefore, the white balance adjustment adapted to color features of the colored picture can be performed.

Also, a color distribution axis is detected in the color distribution axis detecting means according to the white balance information. The color distribution axis is defined as a line segment extending from an original point (or a black point) of a three-dimensional color space to a gravity center of a color distribution of the colored picture. Thereafter, a white balance coefficient is calculated in the white balance coefficient calculating means according to a color at the gravity center of the color distribution of the colored picture. Thereafter, a difference between the white balance coefficient calculated and 1.0 is reduced by a relaxation factor calculated in the relaxation factor calculating means.

Therefore, because the influence of the color distribution axis on the white balance coefficient is reduced by the relaxation factor, it can be prevented that a color of an object placed in a major portion of the colored picture changes to its complementary color, and it can be prevented that a viewer feels strange for colors of a colored picture.

Accordingly, a white balance adjustment appropriate to a colored picture reproduced by a colored picture outputting apparatus such as a video printer can be selectively performed without any erroneous adjustment, and the adverse influence of a high chromaticity region of the colored picture is hardly received.

It is preferred that the white balance information extracted in the white balance information extracting means comprise pieces of block maximum-luminance data WP respectively indicating a color of a maximum-luminance pixel of which a luminance value is the largest among those of pixels in one picture block and a piece of picture maximum-luminance data WPmax indicating a color of a particular maximum-luminance pixel of which a luminance value is the largest among those of maximum-luminance pixels, and it be judged in the white region judging and detecting means that a pixel or a picture block corresponding to the picture maximum-luminance data WPmax is a white region used as a basis of white in a white balance adjustment for the colored picture in cases where a piece of picture data placed farthest from the original point of the three-dimensional color space among the picture data placed in the color distribution of the colored picture agrees with the picture maximum-luminance data WPmax and a luminance value of the picture maximum-luminance data WPmax is higher than a threshold.

In the above configuration, in cases where a major portion of a colored picture is not occupied by any chromatic colored object having a high chromaticity, a color distribution of pieces of picture data of the colored picture is formed in a spindle shape which extends in a luminance direction in a three-dimensional color space. Also, in cases where a white balance is kept in the colored picture, a major-component axis of the color distribution for the colored picture almost agrees with an achromatic color axis of the color space. In this case, a piece of picture data placed at a top portion of the color distribution in a high luminance direction is farthest from the original point of the color space and agrees with the picture maximum-luminance data WPmax. Therefore, the picture maximum-luminance data WPmax can be used as a piece of reference data for the white balance adjustment. In addition, in cases where a luminance of the picture maximum-luminance data WPmax is sufficiently high, a probability that a color designated by the picture maximum-luminance data WPmax is white is heightened.

Also, it is preferred that the color distribution axis detecting means comprise first-stage color distribution axis calculating means for calculating a first two-dimensional color distribution axis indicating a one-sided condition of a first two-dimensional color distribution obtained by projecting the color distribution of the colored picture onto a first two-dimensional color plane, calculating a second two-dimensional color distribution axis indicating a one-sided condition of a second two-dimensional color distribution obtained by projecting the color distribution of the colored picture onto a second two-dimensional color plane and calculating a first-stage color distribution axis in the three-dimensional color space by synchronizing the first two-dimensional color distribution axis and the second two-dimensional color distribution axis; and second-stage color distribution axis calculating means for selecting pieces of inside white balance information, which exist in a cylindrical space having the first-stage color distribution axis as a central axis in the three-dimensional color space, from the white balance information which are extracted in the white balance information extracting means and indicate the color features of the picture blocks and calculating a second-stage color distribution axis extending from the original point of the three-dimensional color space to a gravity center of the inside white balance information as the color distribution axis detected in the color distribution axis detecting means.

In the above configuration, a first-stage color distribution axis roughly indicating a one-sided condition of the color distribution of the colored picture is calculated in the first-stage color distribution axis calculating means. Thereafter, a second-stage color distribution axis indicating a one-sided condition of the color distribution of the colored picture is calculated on condition that pieces of white balance information placed out of the cylindrical space are not considered to prevent the influence of a high chromatic colored object on the calculation of the second-stage color distribution axis. Therefore, an adverse influence of a high chromatic colored object on the white balance adjustment can be removed.

In addition, it is preferred that the first-stage color distribution axis calculating means comprise:

removing block detecting means for detecting a picture block, which is partitioned in the white balance information extracting means and has a uniform chromatic color, as a removing picture block;

first two-dimensional histogram calculating means for calculating a first two-dimensional histogram quantitatively indicating a first two-dimensional processed color distribution obtained by projecting a processed color distribution of the picture blocks of the colored picture except for the removing picture block detected in the removing block detecting means onto the first two-dimensional color plane;

second two-dimensional histogram calculating means for calculating a second two-dimensional histogram quantitatively indicating a second two-dimensional processed color distribution obtained by projecting the processed color distribution onto the second two-dimensional color plane;

first two-dimensional color distribution axis calculating means for calculating the first two-dimensional color distribution axis according to the first two-dimensional histogram calculated in the first two-dimensional histogram calculating means;

second two-dimensional color distribution axis calculating means for calculating the second two-dimensional color distribution axis according to the second two-dimensional histogram calculated in the second two-dimensional histogram calculating means; and three-dimensional color distribution axis generating means for generating the first-stage color distribution axis by synchronizing the first two-dimensional color distribution axis calculated in the first two-dimensional color distribution axis calculating means and the second two-dimensional color distribution axis calculated in the second two-dimensional color distribution axis calculating means, the white balance information extracted in the white balance information extracting means comprise a piece of block average color data AVE indicating an average luminance value, an average first color difference value and an average second color difference value of an average pixel among luminance values, first color difference values and second color difference values of pixels in a particular picture block and a piece of block minimum-luminance data BP indicating a color of a minimum-luminance pixel of which a luminance value is the smallest among those of pixels in the same particular picture block, and the particular picture block be detected as the removing picture block in the removing block detecting means in cases where a difference between the average luminance value of the block average color data AVE and the luminance value of the block minimum-luminance data BP is lower than a first threshold, a chromaticity of the block average color data AVE and a chromaticity of the block minimum-luminance data BP are respectively equal to or higher than a second threshold, and a difference between a hue value of the block average color data AVE and a hue value of the block minimum-luminance data BP is lower than a third threshold.

In the above configuration, in cases where the color designated by the block average color data AVE similar to the color designated by the block minimum-luminance data BP, the particular picture block corresponding to the data AVE and BP is detected as the removing picture block in the removing block detecting means, and the first-stage color distribution axis is generated in the three-dimensional color distribution axis generating means without using the data AVE and BP corresponding to the particular picture block. Therefore, an adverse influence of a picture block occupied by a uniform chromatic color on the calculation of the first-stage color distribution axis can be removed.

Also, it is preferred that the relaxation factor calculating means comprise:

a hue histogram generating unit for preparing six hue regions partitioned by red, yellow, green, cyan, blue and magenta in that order and arranged in a cyclic form and generating a hue histogram having six hue variables which each designate the number of pieces of white balance information which are extracted in the white balance information extracting means for each picture block and are placed in the same hue region;

a histogram type recognizing unit for recognizing whether or not a color distribution of the colored picture is one-sided according to a distribution condition of the hue variables of the hue histogram generated in the hue histogram generating unit;

a plurality of relaxation factor calculating units for respectively calculating a relaxation factor of which a value is set according to the recognition of the color distribution of the colored picture performed in the histogram type recognizing unit and a chromaticity value of a piece of white balance information which indicates color features of the colored picture and is extracted in the white balance information extracting means; and a maximum value selecting unit for selecting one relaxation factor having a maximum value from among the relaxation factors calculated in the relaxation factor calculating units as the relaxation factor calculated in the relaxation factor calculating means, it be recognized in the histogram type recognizing unit that the color distribution of the colored picture is one-sided in cases where the distribution condition of the hue variables of the hue histogram is one-sided to two hue variables corresponding to two hue regions adjacent to each other or the distribution condition of the hue variables of the hue histogram is one-sided to two hue variables having a complementary color relationship, and a value of the relaxation factor calculated in each of the relaxation factor calculating units in cases where it is recognized in the histogram type recognizing unit that the color distribution of the colored picture is one-sided be higher than that in cases where it is recognized in the histogram type recognizing unit that the color distribution of the colored picture is not one-sided.

In the above configuration, in cases where the distribution condition of the hue variables of the hue histogram is one-sided to two hue variables corresponding to two hue regions adjacent to each other, colors of a plurality of pixels of the colored picture are locally distributed around a particular color corresponding to the hue regions adjacent to each other, the color distribution axis detected in the color distribution axis detecting means is greatly inclined toward the particular color, and colors of many pixels undesirably change toward a complementary color as a result of the white balance adjustment. Therefore, a relaxation factor having a high value is set to decrease a degree of the white balance adjustment.

Also, in cases where the distribution condition of the hue variables of the hue histogram is one-sided to two hue variables having a complementary color relationship, it is easy that the color distribution axis is erroneously detected in the color distribution axis detecting means. Therefore, a relaxation factor having a high value is set to decrease a degree of the white balance adjustment.

Accordingly, it can be prevented that a color of an object placed in a major portion of the colored picture changes to its complementary color, and it can be prevented that a viewer feels strange for colors of a colored picture.

Also, it is preferred that the apparatus further comprise: white balance adjustment judging means for judging whether or not a white balance of the colored picture is sufficiently kept and judging whether or not a major portion of the colored picture is occupied by an object having a chromatic color according to the white balance information extracted in the white balance information extracting means, wherein the detection of the white region performed in the white region judging and detecting means and the detection of the color distribution axis performed in the color distribution axis detecting means are stopped in cases where it is judged that a white balance of the colored picture is sufficiently kept or a major portion of the colored picture is occupied by an object having a chromatic color, the white balance information extracted in the white balance information extracting means comprises pieces of block maximum-luminance data WP respectively indicating a color of a maximum-luminance pixel of which a luminance value is the largest among those of pixels in one picture block, pieces of block average color data AVE respectively indicating an average luminance value, an average first color difference value and an average second color difference value of an average pixel among luminance values, first color difference values and second color difference values of pixels in one picture block, a piece of picture maximum-luminance data WPmax indicating a color of a particular maximum-luminance pixel of which a luminance value is the largest among those of maximum-luminance pixels, a piece of block maximum-luminance average color data WPave indicating an average luminance value, an average first color difference value and an average second color difference value among luminance values, first color difference values and second color difference values of the maximum-luminance pixels, a piece of block average color maximum-luminance data AVEmax indicating an average luminance value, an average first color difference value and an average second color difference value of a particular average pixel of which a luminance value is the largest among the average luminance values of the average pixels, a piece of picture average color data AVEave indicating an average luminance value, an average first color difference value and an average second color difference value among the luminance values, the first color difference values and the second color difference values indicated by the pieces of block average color data AVE, a piece of squared chromaticity data WXsqc defined as a sum of a squared first color difference value of the picture maximum-luminance data WPmax and a squared second color difference value of the picture maximum-luminance data WPmax, a piece of squared chromaticity data WAsqc defined as a sum of a squared average first color difference value of the block maximum-luminance average color data WPave and a squared average second color difference value of the block maximum-luminance average color data WPave, a piece of squared chromaticity data AXsqc defined as a sum of a squared average first color difference value of the block average color maximum-luminance data AVEmax and a squared average second color difference value of the block average color maximum-luminance data AVEmax and a piece of squared chromaticity data AAsqc defined as a sum of a squared average first color difference value of the picture average color data AVEave and a squared average second color difference value of the picture average color data AVEave, and it is judged in the white balance adjustment judging means that a major portion of the colored picture is occupied by an object having a chromatic color in cases where the squared chromaticity data WAsqc is equal to or higher than a first threshold, the squared chromaticity data AXsqc is equal to or higher than a second threshold and the squared chromaticity data AAsqc is equal to or higher than a third threshold or it is judged in the white balance adjustment judging means that a white balance of the colored picture is sufficiently kept in cases where the squared chromaticity data WXsqc is equal to or lower than a fourth threshold and the squared chromaticity data WAsqc is equal to or lower than a fifth threshold.

In the above configuration, in cases where it is judged that a major portion of the colored picture is occupied by an object having a chromatic color, an average chromaticity of the colored picture becomes extremely high, and a probability that the white balance adjustment is erroneously performed is high. Therefore, the detection of the white region performed in the white region judging and detecting means and the detection of the color distribution axis performed in the color distribution axis detecting means are stopped by the white balance adjustment judging means. Also, in cases where it is judged that a white balance of the colored picture is sufficiently kept, colors of the colored picture is locally distributed in a color region close to an achromatic color axis (or a line segment extending from black to white) of the color space. Therefore, any white balance adjustment is not required, and the detection of the white region performed in the white region judging and detecting means and the detection of the color distribution axis performed in the color distribution axis detecting means are stopped by the white balance adjustment judging means.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of an apparatus for calculating a degree of white balance adjustment for a picture according to the present invention are described with reference to drawings.

Figure 1:
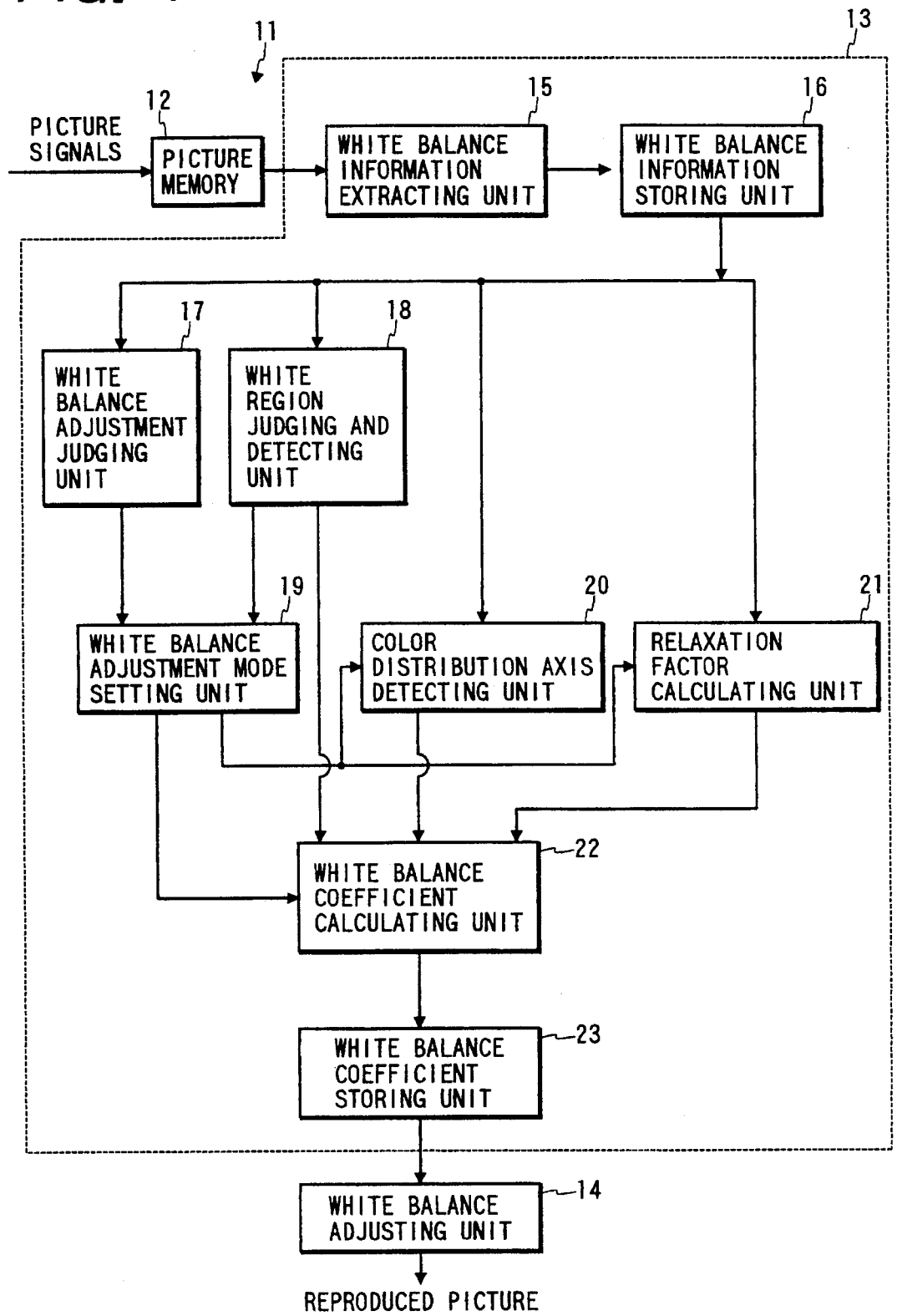
FIG. 1 is a block diagram of an apparatus for adjusting white balance in a colored picture according to an embodiment of the present invention.

FIG. 1 is a block diagram of an apparatus for adjusting white balance in a picture according to an embodiment of the present invention.

As shown in FIG. 1, an apparatus 11 for adjusting white balance in a picture comprises a picture memory 12 for storing a plurality of picture signals of a colored picture as pieces of picture data respectively relating to a pixel of the colored picture, an apparatus 13 for calculating a degree of white balance adjustment for the colored picture by analyzing color features of the colored picture according to the picture data, and a white balance adjusting unit 14 for performing a white valance adjustment for the colored picture according to the degree of white balance adjustment calculated in the apparatus 13.

The apparatus 13 for calculating a degree of white balance adjustment for the colored picture comprises:

a white balance information extracting unit 15 for partitioning the colored picture into a plurality of picture blocks having the same size and extracting pieces of white balance information required to adjust a white balance for the colored picture, the white balance information being classified into pieces of block color information which indicate color features of each picture block and pieces of picture color information which indicate color features of the entire colored picture;

a white balance information storing unit 16 for storing the white balance information extracted in the extracting unit 15; and a white balance adjustment judging unit 17 for judging whether or not a white balance adjustment for the colored picture is required, according to the picture color information of the white balance information stored in the storing unit 16.

In cases where it is judged in the judging unit 17 that any white balance adjustment is not required or the white balance adjustment is difficult, the calculation of a degree of white balance adjustment in the apparatus 13 is stopped.

The apparatus 13 further comprises:

a white region judging and detecting unit 18 for judging whether or not a white region to be used as a basis of the white balance adjustment exists in one of the picture blocks according to the white balance information stored in the storing unit 16 and detecting the white region in cases where the white region exists in one of the picture blocks;

a white balance adjustment mode setting unit 19 for setting a white balance adjustment mode according to the judgement of the judging and detecting unit 18 in cases where it is judged in the judging unit 17 that a white balance adjustment is required;

a color distribution axis detecting unit 20 for detecting a color distribution axis in a three-dimensional color space according to the white balance information stored in the storing unit 16 in cases where the color distribution axis is required to perform the white balance adjustment specified by the white balance adjustment mode set in the setting unit 19;

a relaxation factor calculating unit 21 for calculating a relaxation factor of the white balance adjustment according to the white balance information stored in the storing unit 16 to relax the influence of the color distribution axis detected in the detecting unit 20 on the white balance adjustment;

a white balance coefficient calculating unit 22 for calculating a set of white balance coefficients by using the white region detected in the detecting unit 18 and/or the color distribution axis and the relaxation factor of the white balance adjustment detected/calculated in the units 20 and 21 according to the white balance adjustment mode set in the setting unit 19, a difference between each white balance coefficient and 1.0 being reduced by the relaxation factor, and the white balance coefficients indicating a degree of the white balance adjustment; and a white balance coefficient storing unit 23 for storing the white balance coefficients calculated in the calculating unit 22. The white valance adjustment for the colored picture is performed according to the white balance coefficients in the white balance adjusting unit 14.

Figure 2:
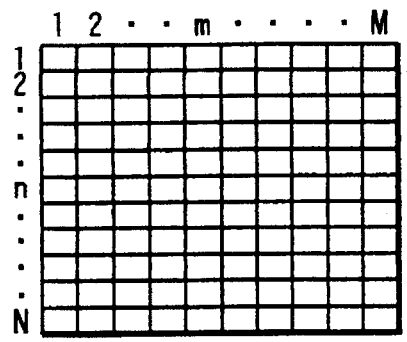
FIG. 2 shows a conceptual view of a plurality of picture blocks obtained by partitioning the colored picture of which the white balance is adjusted in the apparatus shown in FIG. 1.

In the white balance information extracting unit 15, as shown in FIG. 2, a colored picture is partitioned into M*N picture blocks which each are composed of a group of pixels. Each of the picture data represents a color (luminance and color differences) of one pixel, a block maximum-luminance data WP indicating a color of a maximum-luminance pixel of which a luminance value is the largest among those of pixels in one picture block is extracted from pieces of picture data in one picture block for each of the picture blocks, a block luminance minimum data BP indicating a color of a minimum-luminance pixel of which a luminance value is the smallest among those of pixels in one picture block is extracted from pieces of picture data in one picture block for each of the picture blocks, and a block average color data AVE indicating an average luminance value, an average first color difference value and an average second color difference value of an average pixel among luminance values, first color difference values and second color difference values of pixels in one picture block is extracted from pieces of picture data in one picture block for each of the picture block. Also, a piece of luminance data WPy indicating a luminance value of the block maximum-luminance data WP, a piece of first color difference data WP(r–y) indicating a first color difference value of the block maximum-luminance data WP and a piece of second color difference data WP(b–y) indicating a second color difference value of the block maximum-luminance data WP are extracted as pieces of white balance information indicating a block color feature of a maximum luminance pixel for each of the picture blocks. A first color difference is defined as a difference between a red component value r and a luminance value y of a color, and a second color difference is defined as a difference between a blue component value b and the luminance value y of a color. Also, a piece of luminance data BPy indicating a luminance value of the block luminance minimum data BP, a piece of first color difference data BP(r–y) indicating a first color difference value of the block luminance minimum data BP and a piece of second color difference data BP(b-y) indicating a second color difference value of the block luminance minimum data BP are extracted as pieces of white balance information indicating a block color feature of a minimum luminance pixel for each of the picture blocks. Also, a piece of luminance data AVEy indicating an average luminance value among luminance values of a group of pixels relating to a picture block, a piece of first color difference data AVE(r–y) indicating an average first color difference value among first color difference values of the group of pixels and a piece of second color difference data AVE(b–y) indicating an average second color difference value among second color difference values of the group of pixels are extracted as three components of the block average color data AVE to indicate a block color feature for each of the picture blocks.

In addition, a piece of picture maximum-luminance data WPmax having a largest luminance value among the luminance values of the (M*N) pieces of block maximum-luminance data WP are selected, a piece of block maximum-luminance average color data WPave having an average color (luminance and color differences) among color values of the (M*N) pieces of block maximum-luminance data WP are generated, a piece of block average color maximum-luminance data AVEmax having a largest luminance value among luminance values of the (M*N) pieces of block average color data AVE are selected, and a piece of picture average color data AVEave having an average color value among the color values of the (M*N) pieces of block average color data AVE are generated. Also, a piece of luminance data WXy indicating a luminance value of the picture maximum-luminance data WPmax, a piece of first color difference data WX(r–y) indicating a first color difference value of the picture maximum-luminance data WPmax, a piece of second color difference data WX(b–y) indicating a second color difference value of the picture maximum-luminance data WPmax, a piece of squared chromaticity data WXsqc indicating a squared chromaticity $(WX(r-y)^2+WX(b-y)^2)$ of the picture maximum-luminance data WPmax, a piece of luminance data WAy indicating an average luminance value among luminance values of maximum-pixels respectively having a largest luminance value in a picture block, a piece of first color difference data WA(r–y) indicating an average first color difference value among first color difference values of the maximum-pixels, a piece of second color difference data WA(b–y) indicating an average second color difference value among second color difference values of the maximum-pixels, a piece of squared chromaticity data WAsqc indicating a squared chromaticity $(WA(r-y)^2+WA(b-y)^2)$, a piece of luminance data AXy indicating a maximum luminance value among the average luminance values respectively determined in a picture block, a piece of first color difference data AX(r–y) indicating a first color difference value of an average-pixel which has a maximum luminance value among luminance values of average-pixels respectively having an average first color difference in a picture block, a piece of second color difference data AX(b–y) indicating a second color difference value of an average-pixel which has a maximum luminance value among luminance values of average-pixels respectively having an average second color difference in a picture block, a piece of squared chromaticity data AXsqc indicating a squared chromaticity $(AX(r-y)^2+AX(b-y)^2)$, a piece of luminance data AAy indicating an average luminance value obtained by averaging the average luminance values respectively determined in a picture block, a piece of first color difference data AA(r–y) indicating an average first color difference value obtained by averaging the average first color difference values respectively determined in a picture block, a piece of second color difference data AA(b–y) indicating an average second color difference value obtained by averaging the average second color difference values respectively determined in a picture block and a piece of squared chromaticity data AAsqc indicating a squared chromaticity $(AA(r-y)^2+AA(b-y)^2)$ are extracted as the picture color information of the white balance information.

In the white balance adjustment mode setting unit 19, one of first, second and third white balance adjustment modes is set. That is, only the white region detected in the detecting unit 18 is used in the first white balance adjustment mode, the color distribution axis detected in the detecting unit 20 and the relaxation factor of the white balance adjustment calculated in the calculating unit 21 are used in the second white balance adjustment mode, and the white region, the color distribution axis and the relaxation factor of the white balance adjustment detected/calculated in the 18, 20 and 21 are used in the third white balance adjustment mode.

In the color distribution axis detecting unit 20, a first gravity center of the picture data (or picture signals) distributed in a three-dimensional space is calculated, and a rough color distribution axis is first defined as a line connecting an original point (or black point) of the three-dimensional space and the first gravity center. Thereafter, a cylindrical region having the rough color distribution axis as a central axis is set in the three-dimensional space, one or more pieces of outside picture data placed outside the cylindrical region are removed from the picture data because the outside picture data relate to a high chromaticity, and a second gravity center of the picture data from which the outside picture data are removed is calculated. A color distribution axis (or a white balance axis) is defined as a line connecting the original point of the three-dimensional space and the second gravity center, and the second gravity center is used as a reference point for the white balance adjustment.

Figure 3:
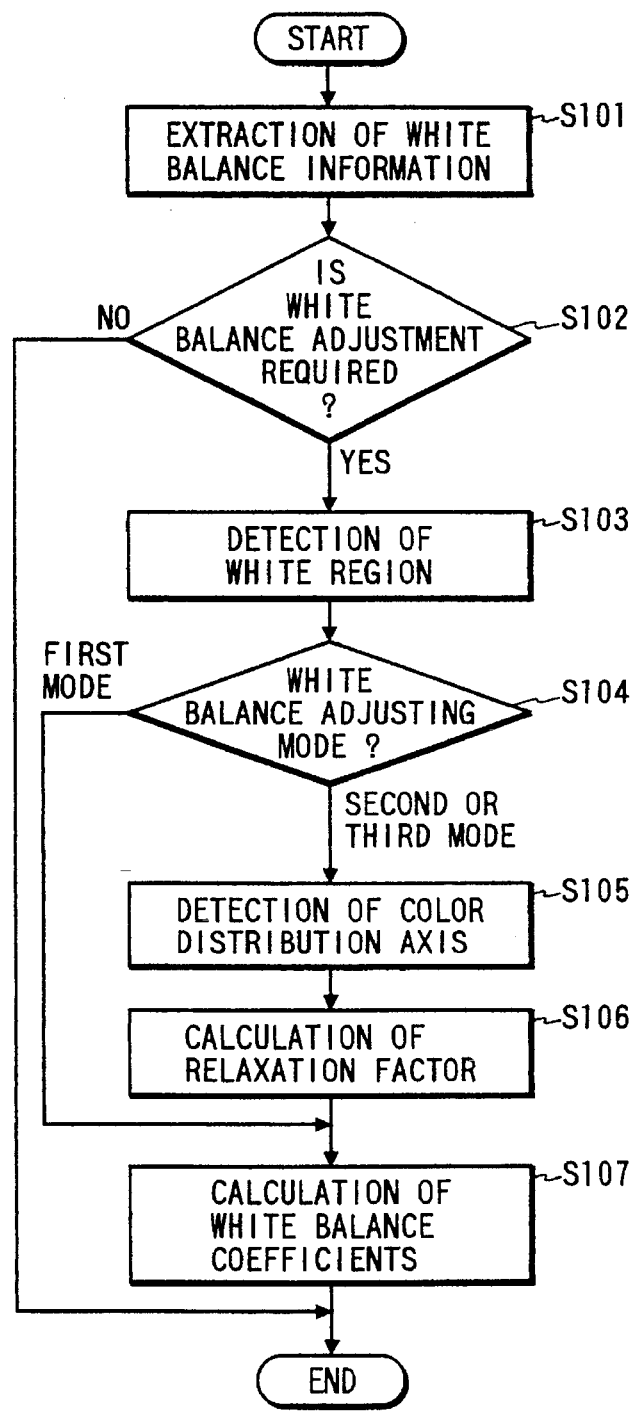
FIG. 3 is a flow chart showing the procedure performed in an apparatus shown in FIG. 1 in which a degree of white balance adjustment for the colored picture is calculated.

In the above configuration, the operation performed in the apparatus 13 for calculating a degree of white balance adjustment is described in brief with reference to FIG. 3.

FIG. 3 is a flow chart showing the procedure for calculating a degree of white balance adjustment for a colored picture.

In a step S101 of FIG. 3, the white balance information are extracted in the white balance information extracting unit 15. In detail, the luminance data WPy, the first color difference data WP(r–y) and the second color difference data WP(b–y) of the block maximum-luminance data WP are extracted as the white balance information of a maximum-luminance pixel for each of the picture blocks in the extracting unit 15, the luminance data BPy, the first color difference data BP(r–y) and the second color difference data BP(b–y) of the block luminance minimum data BP are extracted as the white balance information of a luminance minimum pixel for each of the picture blocks in the unit 15, and the luminance data AVEy, the first color difference data AVE(r–y) and the second color difference data AVE(b–y) of the block average color data AVE are extracted as the white balance information of an average color pixel for each of the picture blocks in the unit 15. That is, three types of color data indicating color features of each picture block are stored as the block color information of the white balance information in the white balance information storing unit 16.

Also, the luminance data WXy, the first color difference data WX(r–y), the second color difference data WX(b–y) and the squared chromaticity data WXsqc of the picture maximum-luminance data WPmax are extracted as the picture color information of the white balance information in the extracting unit 15, the luminance data WAy, the first color difference data WA(r–y), the second color difference data WA(b–y) and the squared chromaticity data WAsqc of the block maximum-luminance average color data WPave are extracted as the picture color information of the white balance information in the extracting unit 15, the luminance data AXy, the first color difference data AX(r–y), the second color difference data AX(b–y) and the squared chromaticity data AXsqc of the block average color maximum-luminance data AVEmax are extracted as the picture color information of the white balance information in the extracting unit 15, and the luminance data AAy, the first color difference data AA(r–y), the second color difference data AA(b–y) and the squared chromaticity data AAsqc of the picture average color data AVEave are extracted as the picture color information of the white balance information in the extracting unit 15. The picture color information indicate the entire picture color features and are stored in the storing unit 16.

In a step S102 of FIG. 3, a chromaticity strength of the colored picture is judged in the white balance adjustment judging unit 17 to judge whether or not a white balance adjustment for the colored picture is required. In cases where a major portion of the colored picture is occupied by a chromatic colored object, it is difficult to perform the white balance adjustment. Therefore, in this case, the white balance adjustment is stopped. Also, in cases where the white balance of the colored picture is sufficiently kept, it is judged that the white balance adjustment is not required. To perform the judgement of the white balance adjustment, the squared chromaticity data WXsqc, WAsqc, AXsqc and AAsqc in the picture color information of the white balance information indicating the entire picture color features are used. In cases where it is judged that the white balance adjustment is required, the procedure proceeds to a step S103.

In the step S103, it is judged in the white region judging and detecting unit 18 whether or not a white region to be used as a basis of the white balance adjustment exists in one of the picture blocks. The judgement is performed by using the picture maximum-luminance data WPmax or the block average color maximum-luminance data AVEmax in the picture color information of the white balance information indicating the entire picture color features. In cases where it is judged that a piece of picture data or a picture block corresponding to the picture maximum-luminance data WPmax or the block average color maximum-luminance data AVEmax has a sufficiently low chromaticity, the existence of a white region is judged in the detecting unit 18, and the first white balance adjustment mode is set in the white balance adjustment mode setting unit 19 (a step S104). That is, a sufficiently low chromatic color of the picture data or the block data is made white in the white balance adjustment performed in the adjusting unit 14 while using a set of white balance coefficients calculated in the calculating unit 22 without performing the detection of any color distribution axis in the detecting unit 20. Also, in cases where it is judged that a piece of picture data or a picture block corresponding to the picture maximum-luminance data WPmax has a low chromaticity, the existence of a region having a color near to white is judged, and the third white balance adjustment mode is set in the white balance adjustment mode setting unit 19 (a step S104). That is, a set of white balance coefficients is calculated in the calculating unit 22 by considering RGB values of the picture maximum-luminance data WPmax and a color distribution axis detected in the detecting unit 20 to perform a white balance adjustment for the colored picture in the adjusting unit 14.

In the step S104, a white balance adjustment mode is set in the setting unit 19. In cases where a white region is detected in the step S103, the first or third white balance adjustment mode is set, and the procedure jumps to a step S107 when the first white balance adjustment mode is set. In contrast, in cases where any white region is not detected in the step S103, the second white balance adjustment mode is set. Thereafter, when the second or third white balance adjustment mode is set, the detection of a color distribution axis is performed in the color distribution axis detecting unit 20 (step S105). In the S105, a color distribution axis (or a white balance axis) connecting the original point of the three-dimensional space and a reference point for a white balance adjustment placed in a gravity center of the picture data from which one or more picture data having high chromaticity are removed is detected.

Thereafter, in a step S106, the calculation of a relaxation factor is performed in the relaxation factor calculating unit 21. To prevent an erroneous detection of a color distribution axis caused when a chromatic colored object considerably influences on the colored picture, a relaxation factor is calculated in the calculating unit 21 according to the block maximum-luminance average color data WPave, the block average color maximum-luminance data AVEmax and the picture average color data AVEave in the picture color information of the white balance information indicating the entire picture color features. Thereafter, an angle between the white balance axis and an achromatic axis in the three-dimensional space is decreased according to a value of the relaxation factor to relax a degree of the white balance of the colored picture.

In a step S107, a set of white balance coefficients is calculated in the white balance coefficient calculating unit 109. In cases where the third white balance adjusting mode is set in the step S104, the white region detected in the step S103 is considered. That is, an intermediate point between coordinates of the white region in the three-dimensional space and the reference point for the white balance determined in the step S105 are set as a new reference point for the white balance of the colored picture. Thereafter, the white balance coefficients denoting amplification gains for colors of the pixels of the colored picture are calculated to place the white balance reference point on the achromatic axis in case of the second white balance adjusting mode or to place the new white balance reference point on the achromatic axis in case of the third white balance adjusting mode.

Next, the operation performed in the apparatus 13 is described in detail.

The block color information of the white balance information extracted in the step 102 are formulated as follows.

the block maximum-luminance data: WP=(WPy,WP(r-y),WP(b-y))

the luminance data: WPy(m,n)=max(y(i,j))

the first color difference data: WP(r-y) (m, n )=(r-y)(i-max, j-max)

the second color difference data: WP(b-y)(m,n)=(b-y)(i-max,j-max)

the block luminance minimum data: BP=(BPy,BP(r-y), BP(b-y)) the luminance data: BPy(m,n)=min(y(i,j))

the first color difference data: BP(r-y)(m,n)=(r-y)(i-min, j-min)

the second color difference data: BP(b-y)(m,n)=(b-y)(i-min,j-min)

the block average color data: AVE=(AVEy,AVE(r-y), AVE(b-y))

the luminance data: AVEy(m,n)=$\Sigma_i\Sigma_j$y(i,j)/(SUM-PIX)

the first color difference data: AVE(r-y)(m,n)=$\Sigma_i\Sigma_j$(r-y)(i, j)/(SUM-PIX)

the second color difference data: AVE(b-y)(m,n)=$\Sigma_i\Sigma_j$(b-y)(i,j)/(SUM-PIX)

Here, (m,n) denotes the number of the picture block, (i,j) denotes the numbers of the pixels placed in a picture block, y(i,j) denotes luminance values of the pixels specified by the pixel numbers (i,j), (i-max,j-max) denotes the number of a maximum-pixel having a largest luminance value among luminance values of pixels for each picture block, (i-min, j-min) denotes the number of a minimum-pixel having a smallest luminance value among luminance values of pixels for each picture block, SUM-PIX denotes the number of pixels in a picture block, max() denotes a maximum calculation, and min() denotes a minimum calculation.

As a color space in which a color used as a basis of the white balance adjustment is calculated, a red-green-blue (RGB) space and a luminance-color differences space are well-known. In this embodiment, the RGB space is adopted. Therefore, luminance values and color difference values of picture signals (or picture data) are converted into red values, green values and blue values (RGB values), and the RGB values are stored in the picture memory 12. In this case, the white balance information extracted in the step 102 are formulated as follows.

the block maximum-luminance data: WP=(WPr,WPg, WPb)

the red data: WPr(m,n)=WP(r-y)+WPy the blue data: WPb(m,n)=WP(b-y)+WPy the green data: WPg(m,n)=(WPy-0.3*WPr-0.11*WPb)/0.59 the block luminance minimum data: BP=(BPr,BPg,BPb)

the red data: BPr(m,n)=BP(r-y)+BPy the blue data: BPb(m,n)=BP(b-y)+BPy the green data: BPg(m,n)=(BPy-0.3*BPr-0.11*BPb)/0.59 the block average color data: AVE=(AVEr,AVEg,AVEb)

the red data: AVEr(m,n)=AVE(r-y)+AVEy the blue data: AVEb(m,n)=AVE(b-y)+AVEy the green data: AVEg(m,n)=(AVEy-0.3*AVEr-0.11*AVEb)/0.59

Also, the picture color information of the white balance information extracted in the step 102 are formulated as follows.

the picture maximum-luminance data: wPmax=(WXy, WX(r-y),WX(b-y))

the luminance data: WXy=max(WPy(m,n))

the first color difference data: WX(r-y)=WP(r-y)(m-wx, n-wx)

the second color difference data: WX(b-y)=WP(b-y)(m-wx,n-wx)

the squared chromaticity data: WXsqc=WX(r-y)$^2$+WX(b-y)$^2$ the block maximum-luminance average color data: WPave=(WAy,WA(r-y),WA(b-y))

the luminance data: WAy=$\Sigma_m\Sigma_n$WPy(m,n)/MN the first color difference data: WA(r-y)=$\Sigma_m\Sigma_n$WP(r-y)(m, n)/MN the second color difference data: WA(b-y)=$\Sigma_m\Sigma_n$WP(b-y)(m,n)/MN the squared chromaticity data: WAsqc=WA(r-y)$^2$+WA(b-y)$^2$ the block average color maximum-luminance data: AVEmax=(AXy,AX(r-y),AX(b-y))

the luminance data: AXy=max(AVEy(m,n))

the first color difference data: AX(r-y)=AVE(r-y)(m-ax, n-ax)

the second color difference data: AX(b-y)=AVE(b-y)(m-ax,n-ax)

the squared chromaticity data: AXsqc=AX(r-y)$^2$+AX(b-y)$^2$ the picture average color data: AVEave=(AAy,AA(r-y), AA(b-y))

the luminance data: AAy=$\Sigma_m\Sigma_n$AVEy(m,n)/MN the first color difference data: AA(r-y)=$\Sigma_m\Sigma_n$AVE(r-y)(m,n)/MN the second color difference data: AA(b-y)=$\Sigma_m\Sigma_n$AVE(b-y)(m,n)/MN the squared chromaticity data: AAsqc=AA(r-y)$^2$+AA(b-y)$^2$ Here, (m,n) denotes the numbers of the picture blocks, (m-wx,n-wx) denotes the number of a maximum-pixel having a largest luminance value among luminance values of the maximum-pixels specified by the pixel numbers (i-max,j-max) in the entire colored picture, MN denotes the number of picture blocks, (m-ax,n-ax) denotes the number of an average-pixel having a largest luminance value among luminance values of average-pixels which each have an average color difference value in a picture block.

A chromaticity of a picture data in the RGB space is defined as a distance between an achromatic axis and the picture data in a RGB cubic color space. However, in this embodiment, a sum (r-y)$^2$+(b-y)$^2$ of a square of a first color difference value (r-y) and a square of a second color difference value (b-y) is treated as a chromaticity value squared for convenience. However, it is applicable that a distance between an achromatic axis and a picture data be calculated as a chromaticity value of the picture data.

In the step S102 of FIG. 3, each of the squared chromaticity data WAsqc, AXsqc and AAsqc is compared with a threshold value, and a colored picture in which a white balance adjustment is difficult because a chromatic colored object strongly influences on the white balance adjustment or a color picture in which any white balance adjustment is not required because the white balance in the colored picture is sufficient is detected. When a high chrominance colored object is detected, the white balance adjustment is stopped.

In detail, in cases where a first condition that the squared chromaticity data WAsqc of the block maximum-luminance average color data WPave is equal to or larger than a prescribed threshold, a second condition that the squared chromaticity data AXsqc of the block average color maximum-luminance data AVEmax is equal to or larger than a prescribed threshold and a third condition that the squared chromaticity data AAsqc of the picture average color data AVEave is equal to or larger than a prescribed threshold are satisfied, a chromaticity of the colored picture is extremely high, and there is a high probability that the white balance adjustment is erroneously performed in the white balance adjusting unit 14. Therefore, the white balance adjustment is stopped. The first to third condition are formulated as follows.

$$WAsqc \geq WAth, AXsqc \geq AXth, \text{ and } AAsqc \geq AAth$$

Here, WAth denotes a threshold for the squared chromaticity data WAsqc, AXth denotes a threshold for the squared chromaticity data AXsqc, AAth denotes a threshold for the squared chromaticity data AAsqc, and $$AXth \geq WAth \geq AAth$$

is satisfied.

Though the probability that the white balance adjustment is erroneously performed is lowered as the thresholds AXth, WAth and AAth are decreased, the effect of the white balance adjustment is reduced. Also, because a relationship among the squared chromaticity data WAsqc, AXsqc and AAsqc is generally expressed as follows:

$$AXsqc \geq WAsqc \geq AAsqc,$$

the relationship $AXth \geq WAth \geq AAth$ of the thresholds is determined.

Also, in cases where the squared chromaticity data WXsqc of the picture maximum-luminance data WPmax and the squared chromaticity data WAsqc of the block maximum-luminance average color data WPave are sufficiently low, the picture data of the colored picture are almost placed on the achromatic axis. In this case, because the white balance of the colored picture is sufficient, any white balance adjustment is not performed. That is, in cases where $$WXsqc \leq WAXmax \text{ and } WAsqc \leq WAXmax$$

are satisfied, any white balance adjustment is not performed. Here, WAXmax denotes an upper limit threshold for the squared chromaticity data WXsqc and WAsqc.

In the step S103 of FIG. 3, it is judged in the white region detecting unit 18 whether or not a white region to be used as a basis of the white balance adjustment exists in one of the picture blocks according to the white balance information.

As one of ideas for the white balance adjustment, a pixel (or a region) which seems to be the most appropriate for white (or an achromatic color) is detected from a colored picture, and the pixel (or the region) is set to white (or the achromatic color). In cases where a viewer watches a colored picture, the viewer pays attention to a white object of the colored picture as a basis for judging whether or not the white balance of the colored picture is appropriately adjusted. For example, even though a color of a chromatic colored object is not correctly reproduced in a colored picture, a viewer is difficult to feel that the color of the chromatic colored object is not correctly reproduced. In contrast, even though an achromatic colored object is slightly colored, the viewer can easily feel that the colored achromatic object is strange. Therefore, prior to the detection of a color distribution axis, the white region judgement is performed by using the picture maximum-luminance data WPmax and the block average color maximum-luminance data AVEmax of the white balance information, and a white balance adjustment is performed in the adjusting unit 14 to make white (or an achromatic color) a sufficiently low chromatic color of a piece of picture data or a picture block corresponding to the picture maximum-luminance data WPmax or the block average color maximum-luminance data AVEmax in cases where it is judged in the detecting unit 18 that the picture block includes a white object (or an achromatic colored object).

Initially, it is judged whether or not a pixel which relates to a piece of picture data corresponding to the picture maximum-luminance data WPmax is equivalent to a white region. In cases where a major portion of a colored picture is not occupied by any chromatic colored object having a high chromaticity, a color distribution of pieces of picture data of the colored picture is formed in a spindle shape which extends in a luminance direction in a three-dimensional color space. Also, in cases where a white balance is kept in the colored picture, a major-component axis of the color distribution for the colored picture almost agrees with an achromatic color axis of the color space. In contrast, in cases where a white balance is not kept in the colored picture, for example, because of the influence of a light source illuminating an object, a major-component axis of the color distribution for the colored picture agrees with a straight line passing through an original point of the color space which crosses the achromatic color axis at an angle. In any case, a top portion of the spindle-shaped color distribution in a high luminance direction is placed at a position of a piece of picture data corresponding to the picture maximum-luminance data WPmax.

That is, in cases where the color distribution is formed in the spindle shape extending in a luminance direction, a piece of picture data placed at a top portion of the color distribution in a high luminance direction agrees with the picture maximum-luminance data WPmax. Therefore, the picture maximum-luminance data WPmax can be used as a piece of reference data for the white balance adjustment. In this embodiment, a block distance dis-wp between the block maximum-luminance data WP and the original point of the color space is determined for each of the picture blocks, and when a piece of block maximum-luminance data WP corresponding to a maximum block distance which is the largest among the M*N block distances dis-wp agrees with the picture maximum-luminance data WPmax, it is judged in the detecting unit 18 that a pixel or a picture block which relates to a piece of picture data corresponding to the picture maximum-luminance data WPmax is equivalent to a white region or a region having a color near to white, and a set of white balance coefficients is calculated in the calculating unit 22 while considering the picture maximum-luminance data WPmax and a detecting result of a color distribution axis (the third white balance adjustment mode).

The judgement of a white color region is formulated as follows.

the block distance: $dis\text{-}wp(m,n) = (WPr(m,n)^2 + WPg(m,n)^2 + WPb(m,n)^2)^{1/2}$ the maximum block distance: $dis\text{-}max = \max(dis\text{-}wp(m,n))$ A maximum distance between the picture maximum-luminance data WPmax and the original point of the color space:

$$dis\text{-}wx = (WXr^2 + WXg^2 + WXb^2)^{1/2}$$

If dis–max=dis–wx is satisfied, the picture maximum-luminance data WPmax is considered for the white balance adjustment.

In addition, when a luminance value of the picture maximum-luminance data WPmax is sufficiently high, a probability that a piece of picture data corresponding to the picture maximum-luminance data WPmax indicates a white region is heightened. Therefore, a first condition that dis–max=dis–wx is satisfied and a second condition that the luminance value WXy of the picture maximum-luminance data WPmax is higher than a prescribed threshold WXYmax (WXy>WXYmax), it is judged in the setting unit 19 that a pixel which relates to a piece of picture data corresponding to the picture maximum-luminance data WPmax is equivalent to a white region, a set of white balance coefficients is calculated in the calculating unit 22 by only considering the picture maximum-luminance data WPmax (the first white balance adjustment mode).

In this embodiment, the block distance between the original point and the block maximum-luminance data WP is calculated. However, it is applicable that a block distance between a piece of particular data having a smallest luminance value among the luminance values BPy of the M*N pieces of block luminance minimum data BP and the block maximum-luminance data WP be calculated for each of the picture blocks. Also, the square root calculation is performed in this embodiment to obtain the block distances dis-wp and the maximum distance dis–wx. However, it is applicable that a distance squared be calculated. Also, it is applicable that a simplified block distance:

$$dis\text{-}wp(m,n) = WPr(m,n) + WPg(m,n) + WPb(m,n)$$

be calculated in place of the block distance dis-wp for convenience.

Thereafter, in cases where it is judged in the detecting unit 18 that a piece of picture data corresponding to the picture maximum-luminance data WPmax does not indicate a white region, it is judged in the detecting unit 18 whether or not a pixel which relates to a piece of picture data corresponding to the block average color maximum-luminance data AVEmax is equivalent to a white region. Even though the picture maximum-luminance data WPmax does not indicate the existence of a white region, there is a case that the block average color maximum-luminance data AVEmax indicates the existence of a white region.

In detail, a first condition that the squared chromaticity data AXsqc of the block average color maximum-luminance data AVEmax is lower than the squared chromaticity data WAsqc of the block maximum-luminance average color data WPave (AXsqc<WAsqc) and a second condition that the squared chromaticity data AXsqc is lower than a prescribed threshold AX-WBC (AXsqc <AX-WBC) are considered, and when the first and second conditions are satisfied, the white balance adjustment is performed in the adjusting unit 14 by only considering the block average color maximum-luminance data AVEmax (the first white mode adjustment mode). The first condition (AXsqc<WAsqc) is added to heighten the reliability that a piece of picture data corresponding to the block average color maximum-luminance data AVEmax indicates the existence of a white region.

Thereafter, in cases where the condition dis–max=dis–wx and WXy>WXYmax is satisfied, a first white balance adjustment mode signal is sent from the detecting unit 18 to the white balance mode setting unit 19 to select the first white balance adjustment mode in the step S104 of FIG. 3, and a piece of white region data Dwr represented by RGB values (WXr, WXg, WXb) of the picture maximum-luminance data WPmax is transferred to the white balance coefficient calculating unit 22. Also, in cases where the condition AXsqc<WAsqc and AXsqc <AX–WBC is satisfied, the first white balance adjustment mode signal is sent to the setting unit 19 in the same manner, and a piece of white region data Dwr represented by RGB values (AVEr, AVEg, AVEb) of the block average color maximum-luminance data AVEmax is transferred to the calculating unit 22. Thereafter, the procedure jumps to a step S107. In contrast, in cases where the condition dis–max=dis–wx and WXy≦WXYmax is satisfied, a third white balance adjustment mode signal is sent from the detecting unit 18 to the setting unit 19 to select the third white balance adjustment mode in the step s104, and a piece of white region data Dwr represented by RGB values (WXr, WXg, WXb) of the picture maximum-luminance data WPmax is transferred to the calculating unit 22. Thereafter, the procedure proceeds to the step S105. In other cases, any white region used as a basis of a white balance adjustment is not detected in the detecting unit 18, a second white balance adjustment mode signal is sent from the detecting unit 18 to the setting unit 19 to select the second white balance adjustment mode in the step S104, and any piece of white region data is not transferred to the calculating unit 22. Thereafter, the procedure proceeds to the step S105.

In the present invention, the assumption that an integrated value (or an average value) of color difference signals for a picture in which an appropriate white balance is kept becomes zero is extended for a colored picture in a three-dimensional color space, and a degree of white balance adjustment for the colored picture is calculated in the apparatus 13 on a second assumption that a major component axis of a three-dimensional color distribution for a colored picture in which a white balance is appropriately kept agrees with an achromatic color axis. Therefore, a method for analyzing major components is preferable in the step S105 of FIG. 3 to detect a color distribution axis of the color distribution. However, in this embodiment, it is assumed that a gravity center of the color distribution is placed on a major component axis of the color distribution, a gravity center of the color distribution is calculated, and a vector from the original point of the color space to a gravity center of the color distribution is defined as a color distribution axis vector. Also, because the second assumption is not correct in a case that a major portion of a colored picture is occupied by an object having a high chromatic color, in the same manner as the assumption that the integrated value of color difference signals becomes zero, it is requited in the step S105 to cope with the case that a major portion of a colored picture is occupied by an object having a high chromatic color.

Therefore, to perform the detection of a color distribution axis by removing the influence of an object having a high chromatic color, there is a suggestion that a cylindrical region having an achromatic color axis of a RGB space as a central axis is set to obtain a gravity center of pieces of picture data existing in the cylindrical region as a gravity center of a color distribution for a colored picture. However, in cases where a major-component axis of the color distribution does not agree with an achromatic color axis of the RGB space, even though the picture data existing in the cylindrical region are selected to determine a gravity center of the color distribution, the determined gravity center of the color distribution is not placed on the achromatic color axis of the RGB space, and the adverse influence of the object having a high chromatic color cannot be removed. The reason is that absolute chromaticity values of the picture data are not correct because the white balance for the colored picture is not kept.

In this embodiment, to perform the detection of a color distribution axis by removing the influence of an object having a high chromatic color, a rough color distribution axis roughly indicating an one-sided degree of the color distribution of the picture data in a three-dimensional color space is initially calculated. The rough color distribution axis is called a first-stage color distribution axis. Thereafter, a cylindrical region having the first-stage color distribution axis as a central axis is set, pieces of picture data placed outside the cylindrical region are removed because the outside picture data are regarded to indicate an object having a high chromaticity, and a second-stage color distribution axis is detected in the detecting unit 20 by using pieces of picture data placed inside the cylindrical region.

Figure 4:
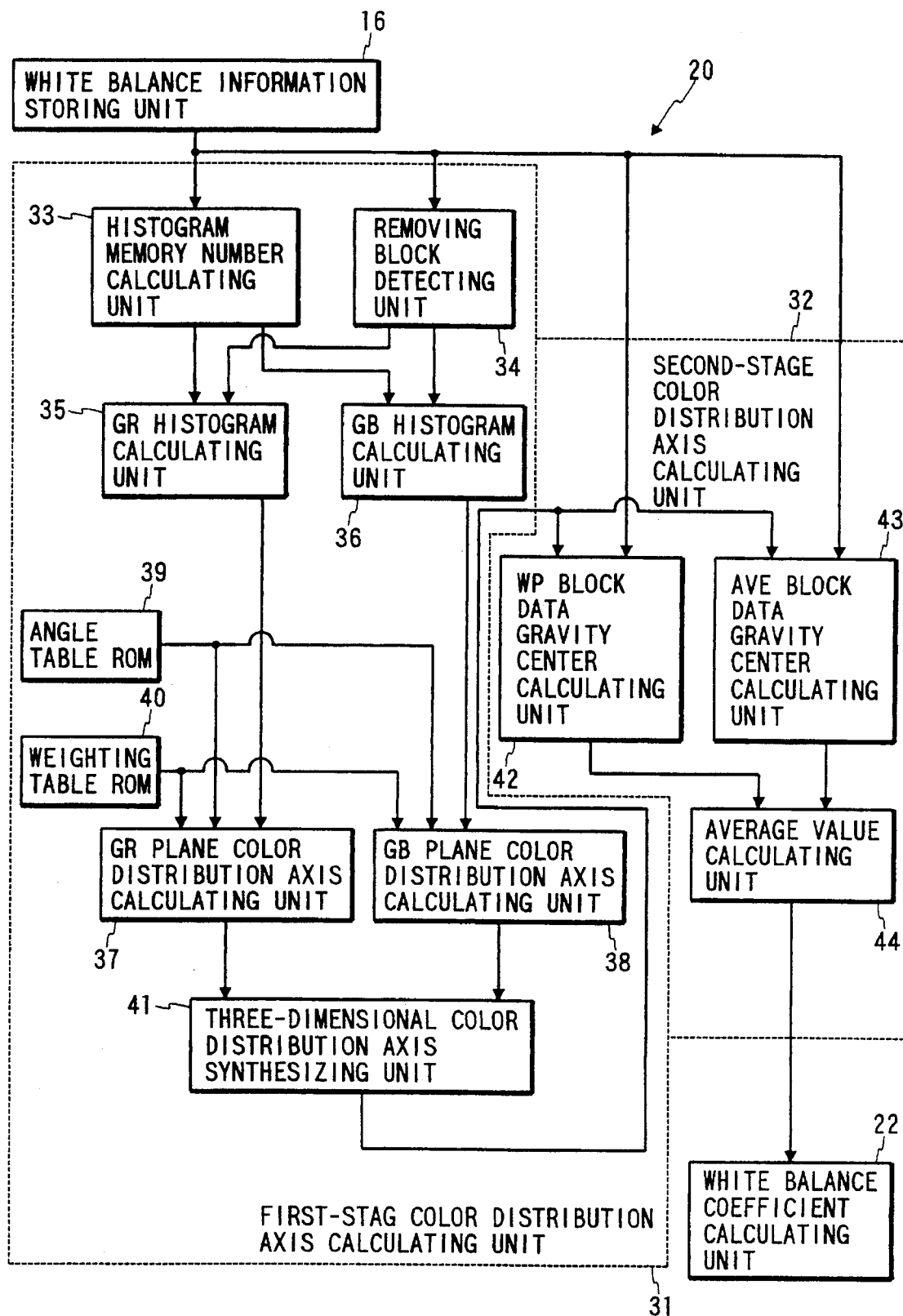
FIG. 4 is a block diagram of a color distribution axis detecting unit shown in FIG. 1.

FIG. 4 is a block diagram of the color distribution axis detecting unit 20 shown in FIG. 1.

As shown in FIG. 4, the color distribution axis detecting unit 20 comprises a first-stage color distribution axis calculating unit 31 for synthesizing two two-dimensional color distribution axes detected in two two-dimensional color planes of a three-dimensional RGB color space and calculating a three-dimensional rough color distribution axis in the color space as a first-stage color distribution axis, and a second-stage color distribution axis calculating unit 32 for setting a cylindrical region having the second-stage color distribution axis as a central axis and calculating a second-stage color distribution axis by using pieces of picture data placed inside the cylindrical region.

The first-stage color distribution axis calculating unit 31 comprises:

a histogram memory number calculating unit 33 for calculating reference memory numbers of a green-red (GR) two-dimensional histogram and reference memory numbers of a green-blue (GB) two-dimensional histogram according to red, green and blue values of the block maximum-luminance data WP, the block average color data AVE and the block luminance minimum data BP stored in the white balance information storing unit 16;

a removing block detecting unit 34 for detecting a picture block composed of a group of pixels having a uniform chromatic color by comparing the block average color data AVE and the block luminance minimum data BP for each of the picture blocks to remove the picture block detected;

a GR histogram calculating unit 35 for calculating a GR two-dimensional histogram for green and red values of the block maximum-luminance data WP, the block average color data AVE and the block luminance minimum data BP, the block maximum-luminance data WP corresponding to all of the picture blocks, the block average color data AVE corresponding to picture blocks which are not removed in the removing block detecting unit 34, the block luminance minimum data BP corresponding to picture blocks which are not removed in the removing block detecting unit 34, and the green and red values of the data WP, AVE and BP being indicated by the reference memory numbers calculated in the histogram memory number calculating unit 33;

a GB histogram calculating unit 36 for calculating a GB two-dimensional histogram for green and blue values of the block maximum-luminance data WP, the block average color data AVE and the block luminance minimum data BP, the block maximum-luminance data WP corresponding to all of the picture blocks, the block average color data AVE corresponding to picture blocks which are not removed in the removing block detecting unit 34, the block luminance minimum data BP corresponding to picture blocks which are not removed in the removing block detecting unit 34, and the green and blue values of the data WP, AVE and BP being indicated by the reference memory numbers calculated in the histogram memory number calculating unit 33;

a GR plane color distribution axis calculating unit 37 for calculating a GR two-dimensional color distribution axis in a GR plane by using the GR two-dimensional histogram calculated in the GR histogram calculating unit 35;

a GB plane color distribution axis calculating unit 38 for calculating a GB two-dimensional color distribution axis in a GB plane by using the GB two-dimensional histogram calculated in the GB histogram calculating unit 36;

an angle table read only memory (ROM) 39 for storing a plurality of GR angles respectively indicating an angle between a straight line connecting a point of the GR two-dimensional plane and an original point of the GR two-dimensional plane and a green axis of the GR two-dimensional plane and storing a plurality of GB angles respectively indicating an angle between a straight line connecting a point of the GB two-dimensional plane and the original point of the GB two-dimensional plane and the green axis of the GR two-dimensional plane;

a weighting table ROM 40 for storing a plurality of weighting factors corresponding to the GR and GB angles stored in the angle table ROM 39 to obtain weighted average angles in the GR plane color distribution axis calculating unit 37 and the GB plane color distribution axis calculating unit 38 in a weighted average angle calculation; and a three-dimensional color distribution axis synthesizing unit 41 for synthesizing the two-dimensional GR color distribution axis output from the GR plane color distribution axis calculating unit 37 and the two-dimensional GB color distribution axis output from the GB plane color distribution axis calculating unit 38 and calculating a three-dimensional first-stage color distribution axis.

The second-stage color distribution axis calculating unit comprises:

a wP block data gravity center calculating unit 42 for setting a cylindrical region having the first-stage color distribution axis calculated in the color distribution axis synthesizing unit 41 as a central axis in the RGB color space and calculating a gravity center of pieces of block maximum-luminance data WP placed in the cylindrical region of the RGB color space;

an AVE block data gravity center calculating unit 43 for setting a cylindrical region having the first-stage color distribution axis calculated in the color distribution axis synthesizing unit 41 as a central axis in the RGB color space and calculating a gravity center of pieces of block average color data AVE placed in the cylindrical region of the RGB color space; and an average value calculating unit 44 for averaging the gravity center of the block maximum-luminance data WP calculated in the WP block data gravity center calculating unit 42 and the gravity center of the block average color data AVE calculated in the AVE block data gravity center calculating unit 43 to obtain an average point in the RGB color space and calculating a second-stage color distribution axis connecting the original point of the RGB color space and the average point.

In the above configuration, an operation of the first-stage color distribution axis calculating unit 31 is described with reference to FIG. 5.

Figure 5:
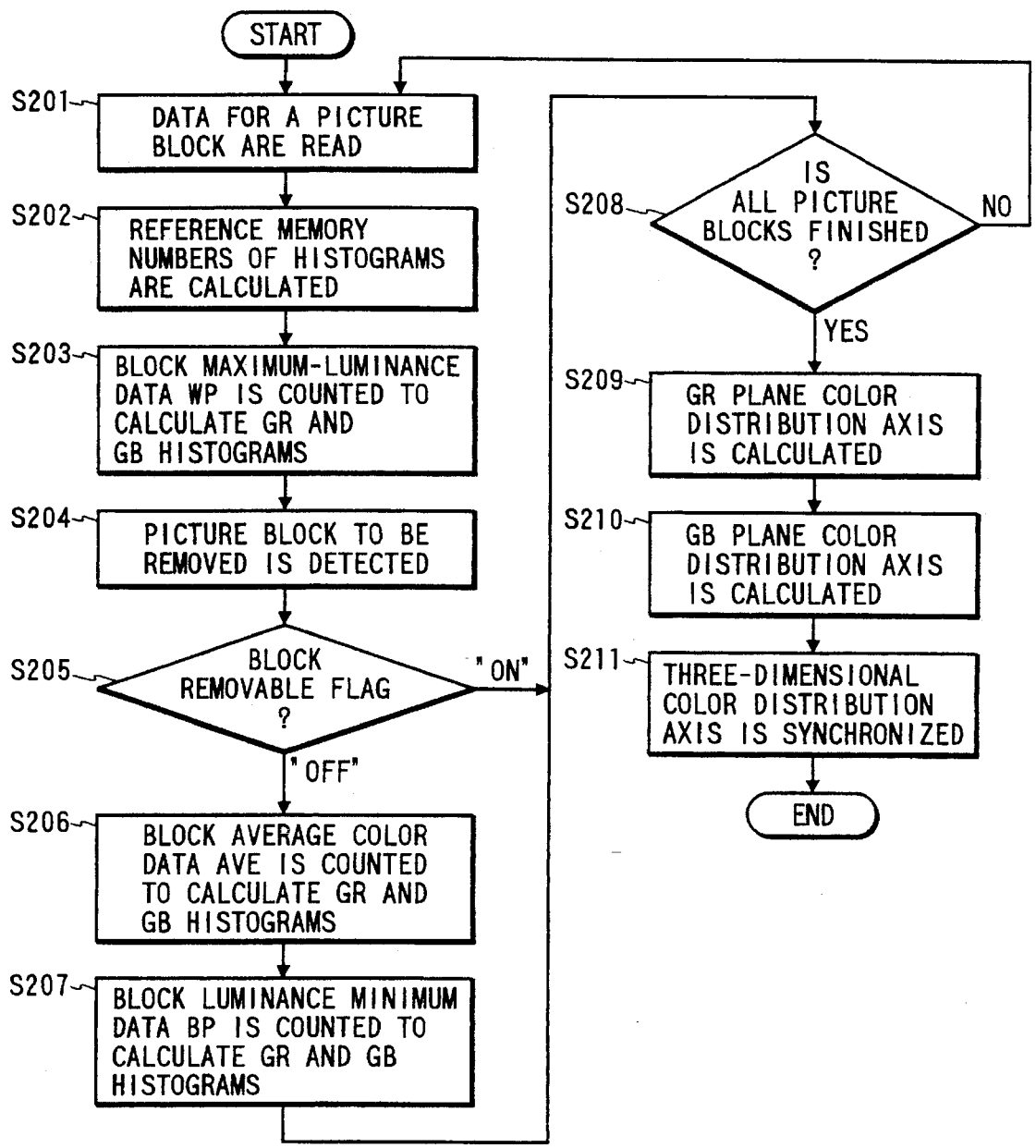
FIG. 5 is a flow chart showing the operation performed in a first-stage color distribution axis detecting unit shown in FIG. 4.

FIG. 5 is a flow chart showing the operation performed in the first-stage color distribution axis calculating unit 31.

As shown in FIG. 5, in a step S201, the block maximum-luminance data WP(WPr,WPg,WPb), the block average color data AVE(AVEr,AVEg,AVEb) and the block luminance minimum data BP(BPr,BPg,BPb) for a particular picture block are transferred from the white balance information storing unit 16 to the histogram memory number calculating unit 33. In a step S202, reference memory numbers of a GR two-dimensional histogram and reference memory numbers of a GB two-dimensional histogram are calculated in the calculating unit 33. The GR two-dimensional histogram is defined as a two-dimensional color distribution obtained by projecting a three-dimensional color distribution defined in the RGB color space onto a GR plane, and the GB two-dimensional histogram is defined as a two-dimensional color distribution obtained by projecting a three-dimensional color distribution defined in the RGB color space onto a GB plane. In this embodiment, to reduce a memory volume required to store the red values, the green values and the blue values (RGB values) of the data WP,AVE and BP, a luminance range (0 to 255) for each of red, green and blue components is partitioned into 16 groups (0 to 15, 16 to 31, - - -, 240 to 255). That is, red, green and blue components of each of the block maximum-luminance data WP, the block average color data AVE and the block luminance minimum data BP are expressed as follows by using reference memory numbers hr (hr=0 to 15) of the red component, reference memory numbers hg (hg=0 to 15) of the green component and reference memory numbers hb (hb=0 to 15) of the blue component.

WP(hr, hg, hb)=(WPr/16, WPg/16, WPb/16)

AVE(hr, hg, hb)=(AVEr/16, AVEg/16, AVEb/16)

BP(hr, hg, hb)=(BPr/16, BPg/16, BPb/16)

In this case, reference memory numbers of each of two-dimensional histograms GR-hist(hg, hr) and GB-hist(hg, hb) are indicated by a two-dimensional 16*16 matrix. That is, each component of the 16*16 matrix in the GR or GB two-dimensional histogram indicates the frequency of particular sets (hg, hr) or (hg, hb) of reference memory numbers of the data WP, AVE and BP.

In a step S203, a GR two-dimensional histogram GR-hist(hg, hr) is calculated in the GR histogram calculating unit 35 by counting a set (hg,hr) of reference memory numbers hg and hr of the block maximum-luminance data WP calculated in the calculating unit 33 for the particular picture block, and a GB two-dimensional histogram GB-hist(hg, hb) is calculated in the GB histogram calculating unit 36 by counting a set (hg, hb) of reference memory numbers hg and hb of the block maximum-luminance data WP calculated in the calculating unit 33 for the particular picture block.

In a step S204, a picture block composed of a group of pixels having a uniform chromatic color is detected in the removing block detecting unit 34 by comparing the block average color data AVE and the block luminance minimum data BP with each other. When it is judged that a color indicated by the block average color data AVE for the particular picture block is similar to that of the block luminance minimum data BP for the particular picture block, a block removal flag is set to "on" to indicate the removal of the picture block.

By comparing the white balance information WP, AVE and BP with each other for each of the picture blocks, color features of each picture block can be grasped in some degree. In particular, the detection of a color distribution axis is disturbed by the white balance information WP, AVE and BP which correspond to a picture block composed of a group of pixels having a uniform chromatic color or a picture block in which an object having a high chromaticity is included. In this embodiment, because the white balance information WP, AVE and BP corresponding to a picture block in which a uniform background such as a blue sky or a uniform background in a portrait is only included are almost the same as each other, the picture block having a uniform chromatic color is removed by comparing luminance, hue and chromaticity of the white balance information AVE and BP with each other. That is, a set of reference memory numbers of the white balance information AVE and BP which correspond to the picture block having a uniform chromatic color is not counted in the calculation of the GR and GB two-dimensional histograms. In this case, because the block maximum-luminance data WP is important to calculate a color distribution axis, a set of reference memory numbers of the block maximum-luminance data WP which corresponds to a picture block having a uniform chromatic color is counted in the calculation of the GR and GB two-dimensional histograms. However, it is applicable that the block maximum-luminance data WP of a picture block having a uniform chromatic color be not considered for the calculation of a color distribution axis.

In the judgement of the picture block removal, luminance, hue and chromaticity values of the white balance information AVE and BP are compared with each other. Because only the comparison calculation is performed, a squared chromaticity value obtained by summing a squared color difference value $(r-y)^2$ and another squared color difference value $(b-y)^2$ is used in place of a chromaticity value for convenience.

Figure 6:
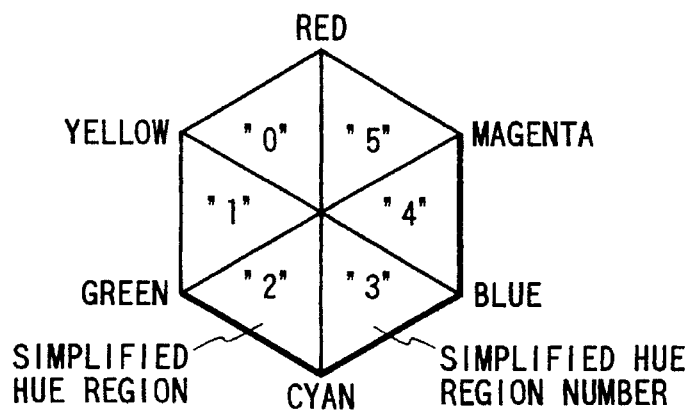
FIG. 6 is a conceptual view of six simplified hue regions used to calculate GR and GB two-dimensional histograms obtained in the first-stage color distribution axis detecting unit shown in FIG. 4.

To obtain hue values of the white balance information AVE and BP, simplified hue region numbers and simplified hue values are calculated by using the RGB values of the white balance information AVE and BP. As shown in FIG. 6, six simplified hue regions are obtained by equally partitioning a hue ring (or a hue plane) formed of a regular hexagonal color-difference plane having six colors R,G,B, C(cyan), M(magenta) and Y(yellow) as six vertexes into six portions (the hue plane is placed in a plane co-ordinate system obtained by objecting a RGB space onto a horizontal plane defined for an achromatic color axis of the RGB space, and the hue plane is generally called a color moment diagram). Simplified hue region numbers 0 to 5 are allocated for the six simplified hue regions. Also, a simplified hue region number 6 is allocated for an achromatic color of which a hue value cannot be defined. The relationship between the simplified hue region numbers Hnum and the colors is as follows.

red and a color from red to yellow: Hnum=0
  yellow and a color from yellow to green: Hnum=1
  green and a color from green to cyan: Hnum=2
  cyan and a color from cyan to blue: Hnum=3
  blue and a color from blue to magenta: Hnum=4
  magenta and a color from magenta to red: Hnum=5
  achromatic color : Hnum=6

A simplified hue region to which each of the white balance information AVE and BP corresponds is determined according to a high and low relationship among the RGB values.

Figure 7:
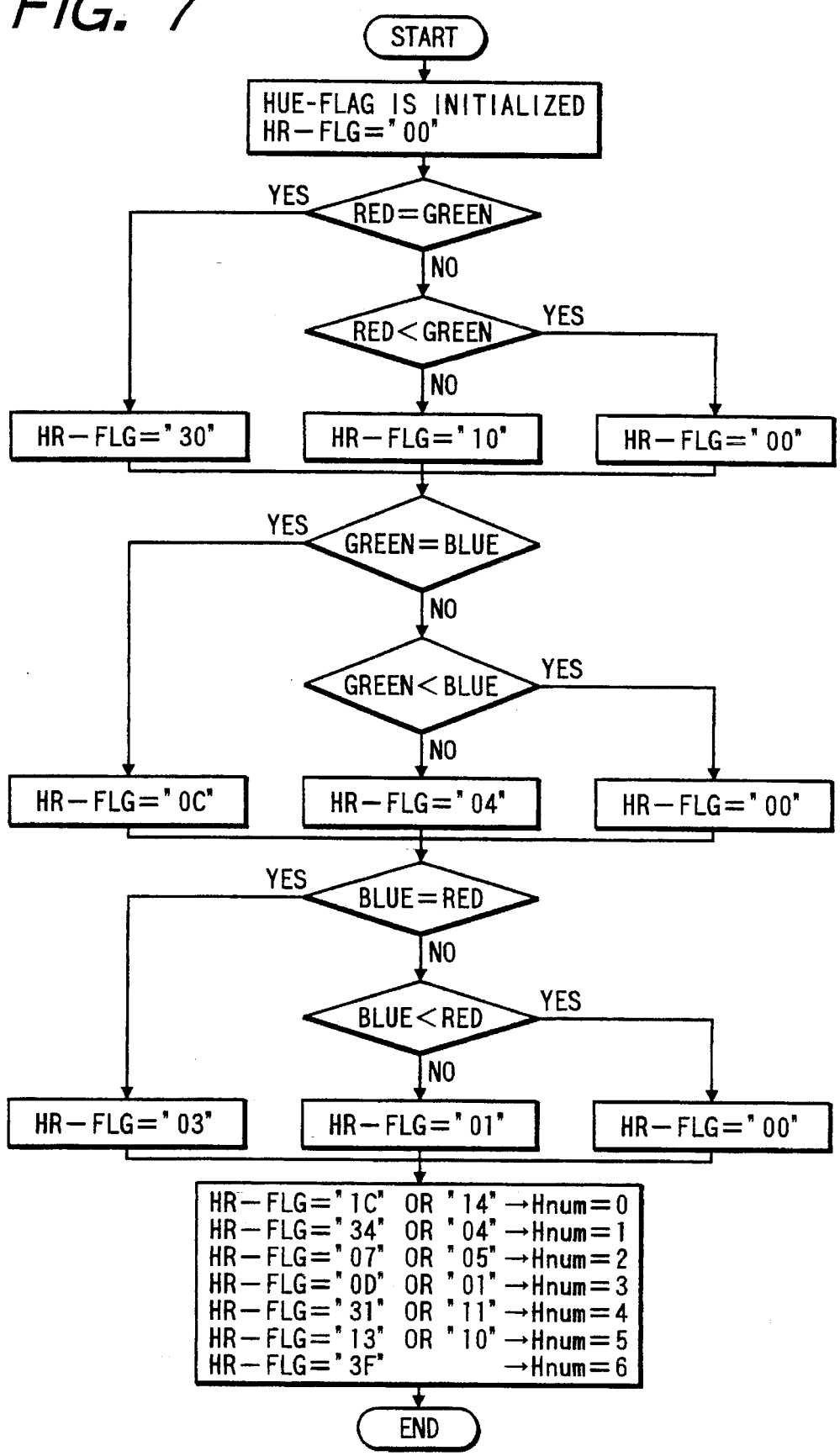
FIG. 7 is a flow chart showing the procedure for determining a simplified hue region number corresponding to a piece of white balance information extracted in a white balance information extracting unit shown in FIG. 1 according to color features of the white balance information.

FIG. 7 is a flow chart showing the procedure for determining a simplified hue region number corresponding to each of the white balance information AVE and BP according to color features of the white balance information AVE and BP.

As a brief description, after a hue-flag (hr-flg) having six bits is initialized, a piece of RG information indicating a high and low relationship between red and green values of a piece of white balance information AVE or BP is written in first two bits of the hue-flag. Thereafter, a piece of GB information indicating a high and low relationship between green and blue values of the white balance information AVE or BP is written in second two bits of the hue-flag. Thereafter, a piece of BR information indicating a high and low relationship between the blue and reds values of the white balance information AVE or BP is written in final two bits of the hue-flag. Thereafter, a simplified hue region number is allocated for the white balance information AVE or BP according to the RG, GB and BR information of the hue-flag.

In FIG. 7, the determination of the simplified hue region number in the hexadecimal notation is shown. In the comparison of the red and green values, when the values are equal to each other, "110000" ("30" in the hexadecimal notation) is added to the hue-flag. In other words, "11" is written in the first two bits of the hue-flag. When the red value is lower than the green value, "000000" ("00" in the hexadecimal notation) is added to the hue-flag. In other words, "00" is written in the first two bits of the hue-flag. When the red value is higher than the green value, "010000" ("10" in the hexadecimal notation) is added to the hue-flag. In other words, "01" is written in the first two bits of the hue-flag. In the comparison of the green and blue values, when the values are equal to each other, "001100" ("0C" in the hexadecimal notation) is added to the hue-flag. In other words, "11" is written in the second two bits of the hue-flag. When the green value is lower than the blue value, "000000" ("00" in the hexadecimal notation) is added to the hue-flag. When the green value is higher than the blue value, "000100" ("04" in the hexadecimal notation) is added to the hue-flag. In the comparison of the blue and red values, when the values are equal to each other, "000011" ("03" in the hexadecimal notation) is added to the hue-flag. In other words, "11" is written in the final two bits of the hue-flag. When the blue value is lower than the red value, "000000" ("00" in the hexadecimal notation) is added to the hue-flag. When the blue value is higher than the red value, "000001" ("01" in the hexadecimal notation) is added to the hue-flag. Therefore, when the hue-flag is summed up to "1c" or "14" in the hexadecimal notation, Hnum=0 is set (red>green= blue, or red>green>blue). When the hue-flag is summed up to "34" or "04" in the hexadecimal notation, Hnum=1 is set (green=red>blue, or green>red>blue). When the hue-flag is summed up to "07" or "05" in the hexadecimal notation, Hnum=2 is set (green>blue=red, or green>blue>red). When the hue-flag is summed up to "0D" or "01" in the hexadecimal notation, Hnum=3 is set (blue=green>red, blue>green>red). When the hue-flag is summed up to "31" or "11" in the hexadecimal notation, Hnum=4 is set (blue>red=green, or blue>red>green). When the hue-flag is summed up to "13" or "10" in the hexadecimal notation, Hnum=5 is set (red=blue>green, red>blue>green). When the hue-flag is summed up to "3F" in the hexadecimal notation, Hnum=6 is set (red=green=blue).

Thereafter, a simplified hue value (hue-val) of the white balance information AVE or BP is calculated according to the simplified hue region number Hnum and the RGB values (AVEr,AVEg,AVEb) or (BPr,BPg,BPb).

$$hue\text{-}val=60*(mid-min)/(max-min)+60*Hnum$$

Here, max denotes a maximum value among the RGB values, mid denotes a middle value among the RGB values, and min denotes a minimum value among the RGB values. When the simplified hue region number is 6, the simplified hue value is set to −1.

For example, in case of the simplified hue region number Hnum=1 on condition that AVEb<AVEr<AVEg or BPb<BPr BPg is satisfied, (red,green,blue)=(AVEr or BPr, AVEg or BPr, AVEb or BPb)=(mid, max, min) is obtained, and the simplified hue value is calculated as follows.

$$hue\text{-}val=60*(mid-min)/(max-min)+60$$

$$=60*(red-blue)/(green-blue)+60$$

Thereafter, block removal conditions for the white balance information AVE and BP are judged by using the simplified hue value calculated. That is, when a color indicated by the block average color data AVE is similar to that of the block luminance minimum data BP, it is judged that a picture block corresponding to the data AVE and BP has a uniform chromatic color, and the block removal conditions are satisfied. The block removal conditions are classified into three block removal conditions.

A first block removal condition is that a luminance difference between the data AVE and BP is lower than a prescribed threshold.

$$SUBy=AVEy-BPy$$

$$SUBy<AB\text{-}Y\text{-}DIF$$

Here, SUBy denotes the luminance difference, and AB-Y-DIF denotes a threshold for the luminance difference.

A second block removal condition is that a squared chromaticity value of the data AVE and a squared chromaticity value of the data BP are respectively equal to or higher than a prescribed threshold.

$$AVEsqc=AVE(r-y)^2+AVE(b-y)^2$$

$$AVEsqc \geqq BRMsqc$$

$$BPsqc=BP(r-y)^2+BP(b-y)^2$$

$$BPsqc \leqq BRMsqc$$

Here, BRMsqc denotes a threshold for the squared chromaticity values AVEsqc and BPsqc.

A third block removal condition is that a hue difference between the data AVE and BP is lower than a prescribed threshold.

$$DEFhue=ABS(BPhue-AVEhue)$$

if DEFhue>180, then DEFhue=360−DEFhue
DEFhue<HUE-DEF
Here, BPhue denotes a simplified hue value of the data BP, AVEhue denotes a simplified hue value of the data AVE, HUE-DEF denotes a threshold value for the hue difference DEFhue, and ABS() denotes an absolute calculation.

When the first to third removal condition are satisfied, a block removal flag is set to "on". Also, a picture block in which an object having an extremely high chromaticity is removed by comparing each of the squared chromaticity values AVEsqc and BPsqc with a prescribed threshold.

In this embodiment, the above block removal conditions are judged. However, any other conditions can be adopted on condition that a picture block which is composed of a group of pixels having an extremely high chromaticity or having a uniform chromatic color and inversely influences the detection of a color distribution axis is detected. Also, it is applicable that the block removal judgement be performed by using not only the data AVE and BP but also the block maximum-luminance data WP.

Thereafter, in a step S205, in cases where the block removal flag is "on", a set of reference memory numbers of each of the white balance information AVE and BP is not counted. In other words, set numbers of any GR or GB histogram are not increased by using the white balance information AVE or BP in any of the calculating units 37 and 38. That is, the procedure jumps to a step S208. In contrast, in cases where the block removal flag is "off", a set of reference memory numbers of the block average color data AVE for the particular picture block is counted in the histogram calculating units 35 and 36 to increase the set numbers in each of the GR and GB two-dimensional histograms (a step S206), and a set of reference memory numbers of the block luminance minimum data BP is counted in the histogram calculating units 35 and 36 to increase the set numbers in each of the GR and GB two-dimensional histograms (a step S207).

Thereafter, it is judged in a step S208 whether or not the white balance information WP, AVE and BP for all of the picture blocks are read in the calculating unit 33 in the step S201. In cases where the white balance information WP, AVE and BP for all of the picture blocks are not read in the calculating unit 33, the white balance information WP, AVE and BP for another picture block are read in the calculating unit 33 in the step S201, and the GR and GB two-dimensional histograms for the data WP, AVE and BP are calculated. In contrast, in cases where the white balance information WP, AVE and BP for all of the picture blocks are read in the calculating unit 33, the GR and GB two-dimensional histograms respectively formed of a 16*16 matrix in which each component indicates the frequency of sets (hg, hr) or (hg, hb) of reference memory numbers of the data WP, AVE and BP adopted are completed, and the procedure proceeds to a step S209.

In the step S209, a GR two-dimensional (or GR plane) color distribution axis in a GR plane is calculated in the GR plane color distribution axis calculating unit 37 by using the GR two-dimensional histogram. Also, in a step S210, a GB two-dimensional (or GB plane) color distribution axis in a GB plane is calculated in the GB plane color distribution axis calculating unit 38 by using the GB two-dimensional histogram.

Figure 8:
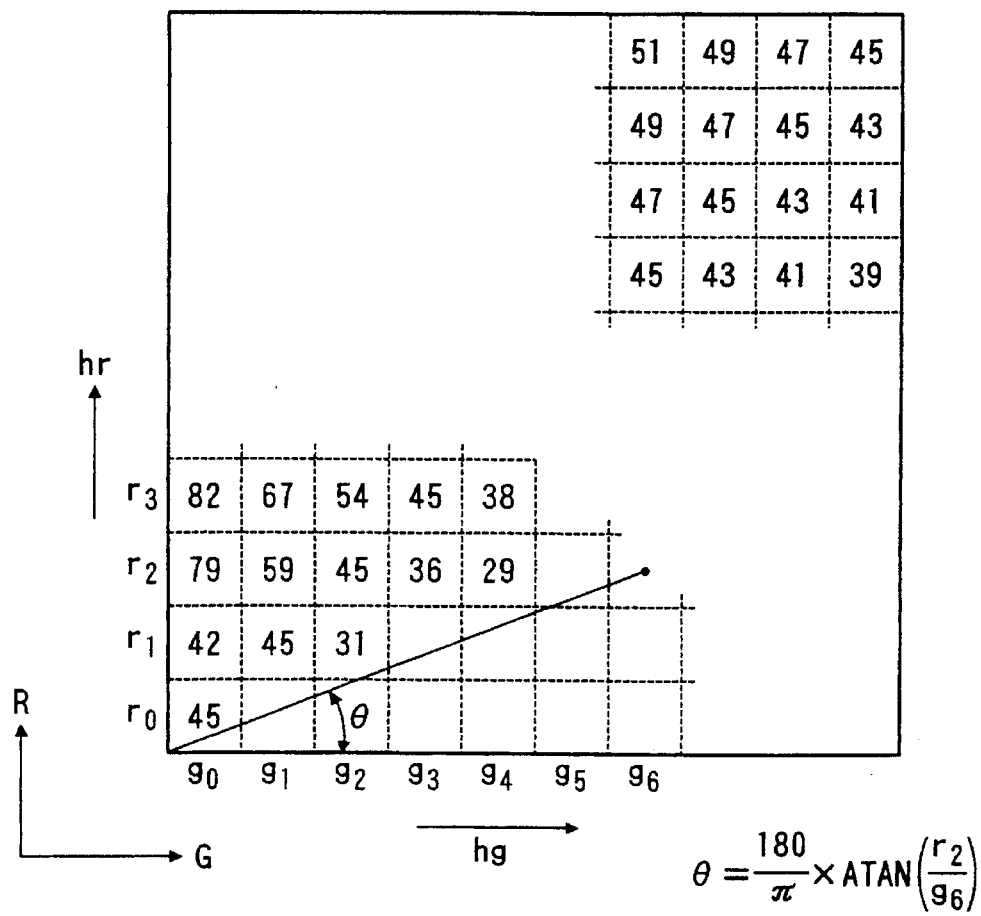
FIG. 8 is a conceptual view of a plurality of GR angles stored in an angle table ROM of the first-stage color distribution axis detecting unit shown in FIG. 4.

In detail, as shown in FIG. 8, a plurality of GR angles respectively indicating an angle between a straight line connecting a point (hg, hr) of the GR two-dimensional plane and an original point of the GR two-dimensional plane and a green axis (hr=0) of the GR two-dimensional plane are stored in advance in the angle table ROM 39. Also, a plurality of GB angles respectively indicating an angle between a straight line connecting a point (hg, hb) of the GB two-dimensional plane and the original point of the GB two-dimensional plane and the green axis (hb=0) of the GR two-dimensional plane are stored in advance in the angle table ROM 39. A GR average angle (GRave-ang) of a group of the white balance information WP, AVE and BP to the green axis in the GR two-dimensional plane is calculated as a GR axis angle between a GR plane color distribution axis and the green axis by using the GR two-dimensional histogram GR-hist(hg, hr) and the GR angles, and a GB average angle (GBave-ang) of a group of the white balance information WP, AVE and BP to the green axis in the GB two-dimensional plane is calculated as a GB axis angle between a GB plane color distribution axis and the green axis by using the GB two-dimensional histogram GB-hist(hg, hb) and the GB angles.

$$GRave\text{-}ang=\Sigma_{hg}\Sigma_{hr}\{Grhist(hg,hr)*GRang(hg,hr)\}/\{\Sigma_{hg}\Sigma_{hr}\{GRhist(hg,hr)\}$$

$$GBave\text{-}ang=\Sigma_{hg}\Sigma_{hb}\{GBhist(hg,hb)*GBang(hg,hb)\}/\{\Sigma_{hg}\Sigma_{hb}\{GBhist(hg,hb)\}$$

Here, GRhist(hg,hr) denotes the frequency of sets of particular reference memory numbers (hg,hr) for the white balance information WP, AVE and BP counted to calculate the GR two-dimensional histogram, GBhist(hg,hb) denotes the frequency of sets of particular reference memory numbers (hg,hb) for the white balance information WP, AVE and BP counted to calculate the GB two-dimensional histogram, GRang(hg,hr) denotes a GR angle for the set of particular reference memory numbers (hg,hr), and GBang(hg,hb) denotes a GB angle for the set of particular reference memory numbers (hg,hb).

In addition, the GR and GB average angles calculated are respectively weighted by multiplying each of the GR and GB angles by a weighting factor stored in the weighting table ROM 40 to obtain a GR weighted average angle and a GB weighted average angle. In this case, the weighting factor by which a GR or GB angle is multiplied is decreased as the GR or GB angle becomes far from an angle of 45°. The reason is as follows. White balance coefficients calculated in the white balance coefficient calculating unit 22 are increased as a color distribution axis calculated in the color distribution axis calculating unit 37 or 38 is placed far from an achromatic color axis of the RGB color space. Therefore, when a white balance adjustment is performed in the adjusting unit 14 for a colored picture by using white balance coefficients having a high value, colors of the colored picture greatly change. In cases where the detection of a color distribution axis is incorrectly performed in the detecting unit 20, colors of the colored picture easily change to complementary colors, and there is a drawback that a viewer easily feels strange for the colored picture after the white balance adjustment.

To avoid the drawback, because the achromatic color axis projected onto the GR or GB plane agrees with a line passing through the original point of the GR or GB plane at an angle of 45° to the green axis, the weighting factor is increased as the GR or GB angle adopted in the calculating unit 37 or 38 is close an angle of 45°, and a probability that a color distribution axis far from the achromatic color axis is detected in the detecting unit 20 is reduced. Therefore, a first-stage color distribution axis obtained in the calculating unit 41 by synchronizing a GR plane color distribution axis making the GR weighted average angle to the green axis on the GR plane and a GB plane color distribution axis making the GB weighted average angle to the green axis on the GB plane roughly indicates a one-sided degree of the color distribution obtained from the picture data (though the first-stage color distribution axis is roughly directed toward a gravity center of the color distribution), the gravity center of the color distribution is not placed on the first-stage color distribution axis.

The GR and GB weighted average angles are expressed as follows.

$$GRwt\text{-}ang = \Sigma_{hg}\Sigma_{hr}\{GRhist(hg,hr)*GRang(hg,hr)*wgt(ang(hg,hr))\}/\{\Sigma_{hg}\Sigma_{hr}\{GRhist(hg,hr)*wgt(ang(hg,hr))\}$$

$$GBwt\text{-}ang = \Sigma_{hg}\Sigma_{hb}\{GBhist(hg,hb)*GBang(hg,hb)*wgt(ang(hg,hb))\}/\{\Sigma_{hg}\Sigma_{hb}\{GBhist(hg,hb)*wgt(ang(hg,hb))\}$$

Here, GRwt-ang denotes the GR weighted average angle, GBwt-ang denotes the GB weighted average angle, wgt(ang(hg,hr)) denotes a weighting factor for the GR angle GRang(hg,hr), and wgt (ang(hg,hb)) denotes a weighting factor for the GB angle GBang(hg,hb).

In this embodiment, the frequency of sets of reference memory numbers in each of the histograms are considered to calculate the average angles or the weighted average angles. However, it is applicable that the average angle or the weighted average angle be calculated by using particular sets (hg, hr) or (hg, hb) without considering the frequency of sets on condition that the frequency of the particular sets (hg, gr) or (hg, hb) for all of the picture blocks is higher than a prescribed threshold.

Thereafter, a GR vector of the GR plane color distribution axis is calculated by using the GR weighted average angle GRwt-ang, and a GB vector of the GB plane color distribution axis is calculated by using the GB weighted average angle GBwt-ang. In this case, to detect the GR and GB two-dimensional color distribution axes, lengths of the GR and GB vectors are not required, but directions of the GR and GB vectors are only required. Therefore, when the GR vector of the GR plane color distribution axis is expressed by (GRvec–g, GRvec–r) and the GB vector of the GB plane color distribution axis is expressed by (GBvec–g, GBvec–b), values Grvec–r and GBvec–b are calculating by setting values Grvec–g to, for example, 128.

$$\begin{aligned} Grvec-r &= Grvec-g * \tan(Grwt-ang * \pi/180) \\ &= 128 * \tan(Grwt-ang * \pi/180) \\ Gbvec-b &= Gbvec-g * \tan(Gbwt-ang * \pi/180) \\ &= 128 * \tan(Gbwt-ang * \pi/180) \end{aligned}$$

Therefore, the GR and GB plane color distribution axes are substantially determined. In this calculation, it is applicable that values of tan(Grwt-ang * π/180) and tan(Gbwt-ang * π/180) be obtained by using a trigonometric function table.

Finally, the GR and GB plane color distribution axes calculated in the calculating units 37 and 38 (steps S209 and S210) are synthesized, and a RGB vector (Grvec–r, GBvec–g, GBvec–b) of a first-stage color distribution axis is obtained in the three-dimensional color distribution axis calculating unit 41 (step S211).

$$(Grvec-r, GBvec-g, Gbvec-b) = (128, \tan(Grwt-ang * \pi/180), 128 * \tan(Gbwt-ang * \pi/180))$$

The RGB vector (Grvec–r, GBvec–g, GBvec–b) of the first-stage color distribution axis is transferred to the second-stage color distribution axis detecting unit 32.

Figure 9:
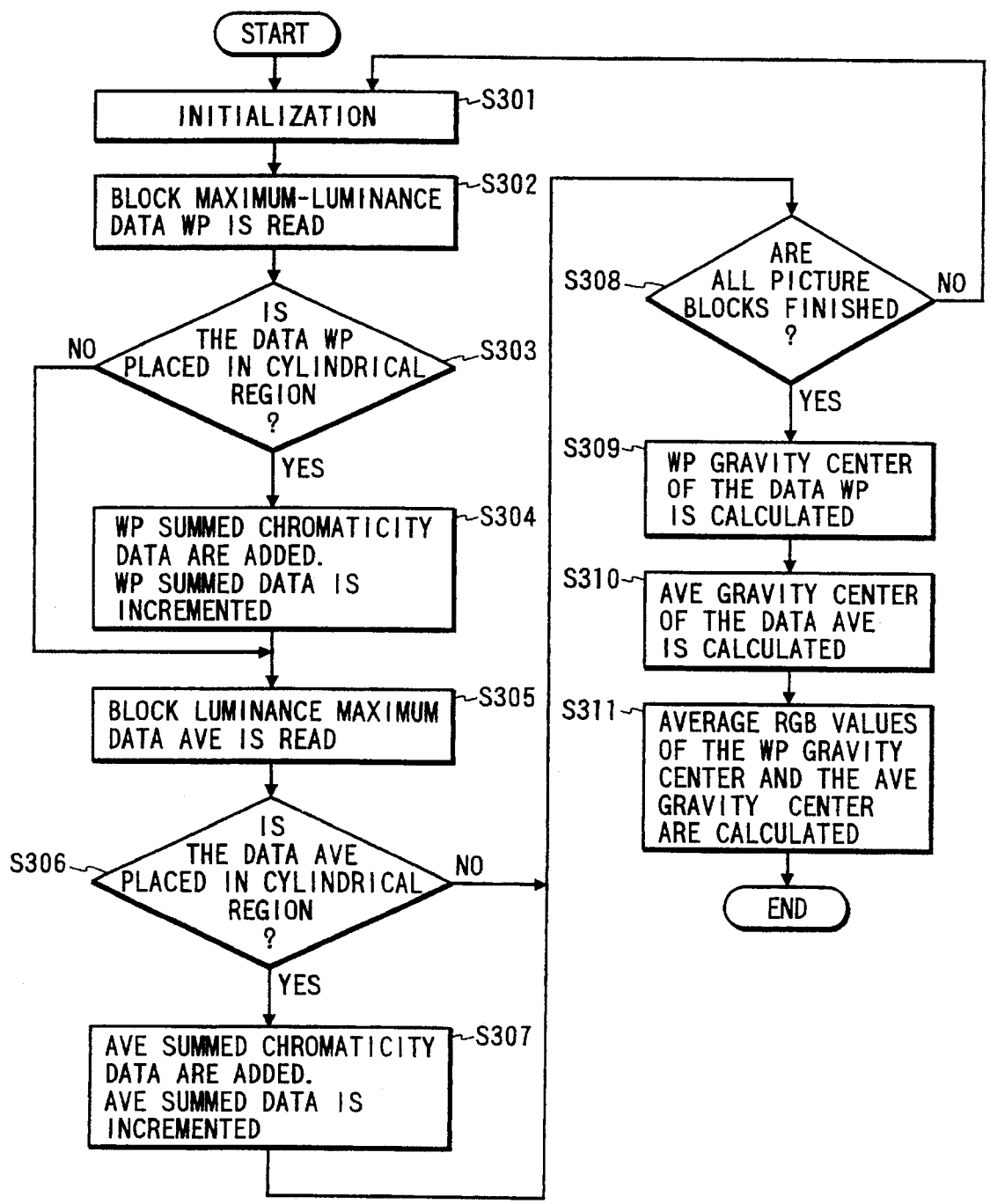
FIG. 9 is a flow chart showing the operation performed in a second-stage color distribution axis detecting unit shown in FIG. 4.

FIG. 9 is a flow chart showing the operation performed in the second-stage color distribution axis detecting unit 32.

In the second-stage color distribution axis detecting unit 32, gravity centers of pieces of data WP and pieces of data AVE placed in a cylindrical region of the RGB color space having the first-stage color distribution axis as a central axis are calculated. The reason is that the first-stage color distribution axis is used as a central axis of the cylindrical region is because there is no reliability for chromatic values of the data WP or AVE. That is, the chromaticity of the data wP or AVE is defined by regarding the first-stage color distribution axis as an achromatic color axis of the RGB color space, pieces of data WP or AVE having a high chromaticity are removed, and the reliability for the detection of a color distribution axis is heightened.

In detail, as shown in FIG. 9, a WP data memory of the WP data gravity center calculating unit 42 and an AVE data memory of the AVE data gravity center calculating unit 43 are initialized in a step S301. That is, pieces of WP summed chromaticity data (WPsum-r, WPsum-g, WPsum-b) indicating summed RGB values of pieces of block maximum-luminance data WP placed in the cylindrical region, pieces of AVE summed chromaticity data (AVEsum-r, AVEsum-g, AVEsum-b) indicating summed RGB values of pieces of block average color data AVE placed in the cylindrical region, a piece of WP summed data WPsum indicating the number of block maximum-luminance data WP placed in the cylindrical region and a piece of AVE summed data AVEsum indicating the number of block average color data AVE placed in the cylindrical region are set to zero.

Thereafter, in a step S302, a piece of block maximum-luminance data WP(WPr, WPg, WPb) for a picture block (m,n) is transferred from the white balance information storing unit 16 to the calculating unit 42. Thereafter, it is judged in a step S303 whether or not the data WP is placed in the cylindrical region having a prescribed radius in which the first-stage color distribution axis obtained in the first-stage color distribution axis calculating unit 31 is used as a central axis. The judgement is performed by calculating a distance between the data WP and the first-stage color distribution axis. In this case, because it is required whether the data WP is placed inside or outside of the cylindrical region, a squared distance between the data WP and the first-stage color distribution axis is compared with a squared radius Rcy2 of the cylindrical region. The squared distance WPDsqr is calculated as follows.

$$WPDsqr = A - B*B/C$$

$$A = WPr*WPr + WPg*WPg + WPb*WPb$$

$$B = Grvec-r*Grvec-r + Gbvec-g*GBvec-g + Gbvec-b*GBvec-b$$

$$C = WPr*Grvec-r + WPg*GBvec-g + WPb*GBvec-b$$

Here, (Grvec–r, GBvec–g, Gbvec–b) denotes the RGB vector of the first-stage color distribution axis, and (WPr, WPg, WPb) denotes coordinates of the data WP.

In cases where it is judged that the WP data is placed in the cylindrical region because $$WPDsqr(m,n) \leq Rcy^2$$

is satisfied, in a step S304, each component of the WP summed chromaticity data (WPsum-r, WPsum-g, WPsum-b) is added and the wP summed data WPsum is incremented as follows.

$$WPsum-r=WPsum-r+WPr(m,n)$$

$$WPsum-g=wPsum-g+wPg(m,n)$$

$$WPsum-b=WPsum-b+WPb(m,n)$$

$$WPsum=WPsum+1$$

Here, WPDsqr(m,n) denotes the squared distance of the data WP for the picture block (m,n).

Thereafter, in a step S305, a piece of block luminance maximum data AVE(AVEr, AVEg, AVEb) for the picture block (m,n) is read in the calculating unit 43, it is judged in a step S306 whether or not the data AVE is placed in the cylindrical region by comparing a squared distance AVEDsqr with the squared radius Rcy². The squared distance AVEDsqr is calculated as follows.

$$AVEDsqr=A-B*B/C$$

$$A=AVEr*AVEr+AVEg*AVEg+AVEb*AVEb$$

$$B=Grvec-r*Grvec-r+Gbvec-g*GBvec-g+Gbvec-b*GBvec-b$$

$$C=AVEr*Grvec-r+AVEg*GBvec-g+AVEb*GBvec-b$$

Here, (AVEr, AVEg, AVEb) denotes coordinates of the data AVE.

In cases where it is judged that the WAVE data is placed in the cylindrical region because $$AVEDsqr(m,n) \leq Rcy^2$$

is satisfied, in a step S307, each component of the AVE summed chromaticity data (AVEsum-r, AVEsum-g, AVEsum-b) is added and the AVE summed data AVEsum is incremented as follows.

$$AVEsum-r=AVEsum-r+AVEr(m,n)$$

$$AVEsum-g=AVEsum-g+AVEg(m,n)$$

$$AVEsum-b=AVEsum-b+AVEb(m,n)$$

$$AVEsum=AVEsum+1$$

Here, AVEDsqr(m,n) denotes the squared distance of the data AVE for the picture block (m,n).

In this embodiment, an AVE calculation of the AVE summed chromaticity data and the AVE summed data is performed after a WP calculation of the WP summed chromaticity data and the WP summed data. However, it is applicable that the both calculations be performed in parallel.

Thereafter, in cases where the data WP and the data AVE for all of the picture blocks are not read in the calculating unit 42 and 43, the procedure returns to the step S302 to read another piece of WP data for another picture block. In contrast, in cases where the data WP and the data AVE for all of the picture blocks are read in the calculating unit 42 and 43, a WP gravity center (WPgc-r, WPgc-g, WPgc-b) of the data WP placed in the cylindrical region is calculated in the WP data gravity center calculating unit 42 (step S309).

$$WPgc-r=WPsum-r/WPsum$$

$$WPgc-g=WPsum-g/WPsum$$

$$WPgc-b=WPsum-b/WPsum$$

Also, an AVE gravity center of the data AVE placed in the cylindrical region is calculated in the AVE data gravity center calculating unit 43 (step S310).

$$AVEgc-r=AVEsum-r/AVEsum$$

$$AVEgc-g=AVEsum-g/AVEsum$$

$$AVEgc-b=AVEsum-b/AVEsum$$

Thereafter, a piece of average data (WBr, WBg, WBb) indicating average RGB values at an average point of the WB gravity center and the AVE gravity center is calculated in the average value calculating unit 44 (step S311).

$$WBr=(WPgc-r+AVEgc-r)/2$$

$$WBg=(WPgc-g+AVEgc-g)/2$$

$$WBb=(WPgc-b+AVEgc-b)/2$$

A second-stage color distribution axis vector (WBr, WBg, WBb) is defined as a vector extending from the original point (0,0,0) of the RGB color space to the average point of the WB gravity center and the AVE gravity center.

Thereafter, the second-stage color distribution axis vector (WBr, WBg, WBb) obtained in the color distribution axis detecting unit 20 is transferred to the white balance coefficient calculating unit 22, and a relaxation factor is calculated in the relaxation factor calculating unit 21 (step 106 of FIG. 3).

The reason that the calculation of the relaxation factor is required is described. The detection of the second-stage color distribution axis is performed by calculating a gravity center of the color distribution on the assumption that the color distribution is formed in a spindle shape extending in a luminance direction in the RGB color space. However, there are many cases that a color distribution of a colored picture is not formed in the spindle shape. For example, in cases where a major portion of a color picture is occupied by a chromatic colored object such as a blue sky, a gravity center of a color distribution of the colored picture is one-sided toward a chromatic color of the object. Also, in cases where two chromatic colored objects having different hues exist in a colored picture, two clusters of color distributions for the colored picture are formed in the RGB color space. Therefore, even though one or more picture blocks respectively composed of a group of pixels having a uniform chromatic color are removed for the calculation of the first-stage color distribution axis and one or more picture blocks represented by the data WP and AVE indicating a high chromaticity are removed for the calculation of the second-stage color distribution axis, it is easy that the second-stage color distribution axis (or a white balance axis) is erroneously detected in cases where a major portion of a colored picture is occupied by a high chromatic colored object or a color distribution shape of a colored picture is complicated. Therefore, it is important to perform the white balance adjustment corresponding to a color distribution of a colored picture.

However, in cases where the second-stage color distribution axis is detected while considering a condition of the color distribution, the detection of the second-stage color distribution axis is complicated. In this embodiment, a relaxation factor is used to adjust a degree of a white balance adjustment according to pieces of color information and a color distribution condition of the colored picture. That is, to calculate the relaxation factor, the picture maximum-luminance average color data WPave, the block average color maximum-luminance data AVEmax and the picture average color data AVEave indicating color features of the entire colored picture are used. The detection of the second-stage color distribution axis (or a white balance axis) becomes difficult as chromaticity values of the data WPave, AVEmax and AVEave are increased, and a value of the relaxation factor is increased. Also, when a colored picture having a one-sided hue distribution for which the white balance adjustment is difficult is detected by considering a distribution condition of hue values of the block average color data AVE in a plurality of hue regions which are obtained by partitioning a color difference plane, a degree of relaxation for the colored picture is increased.

Figure 10:
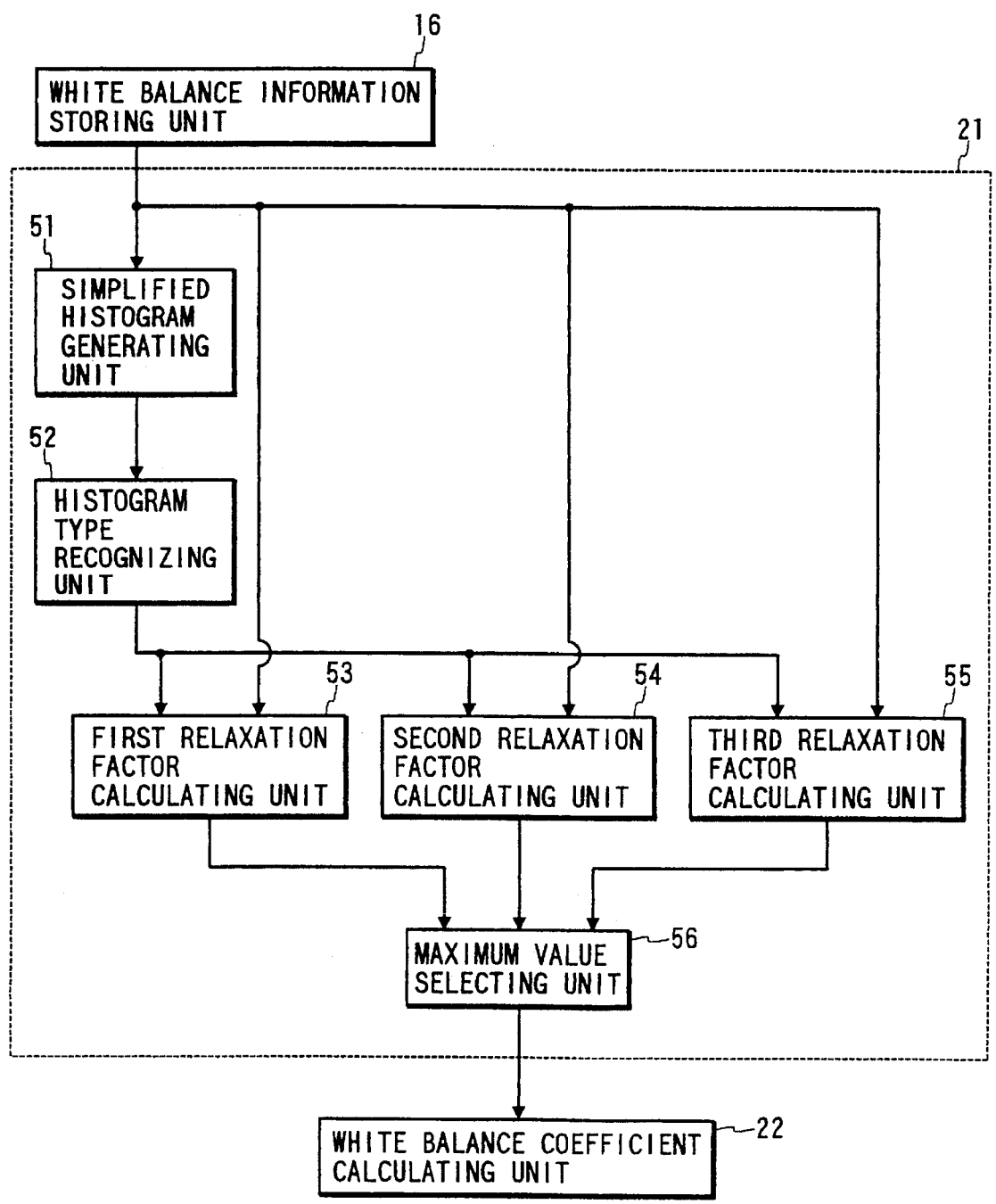
FIG. 10 is a block diagram of a relaxation factor calculating unit shown in FIG. 1.
Figure 11:
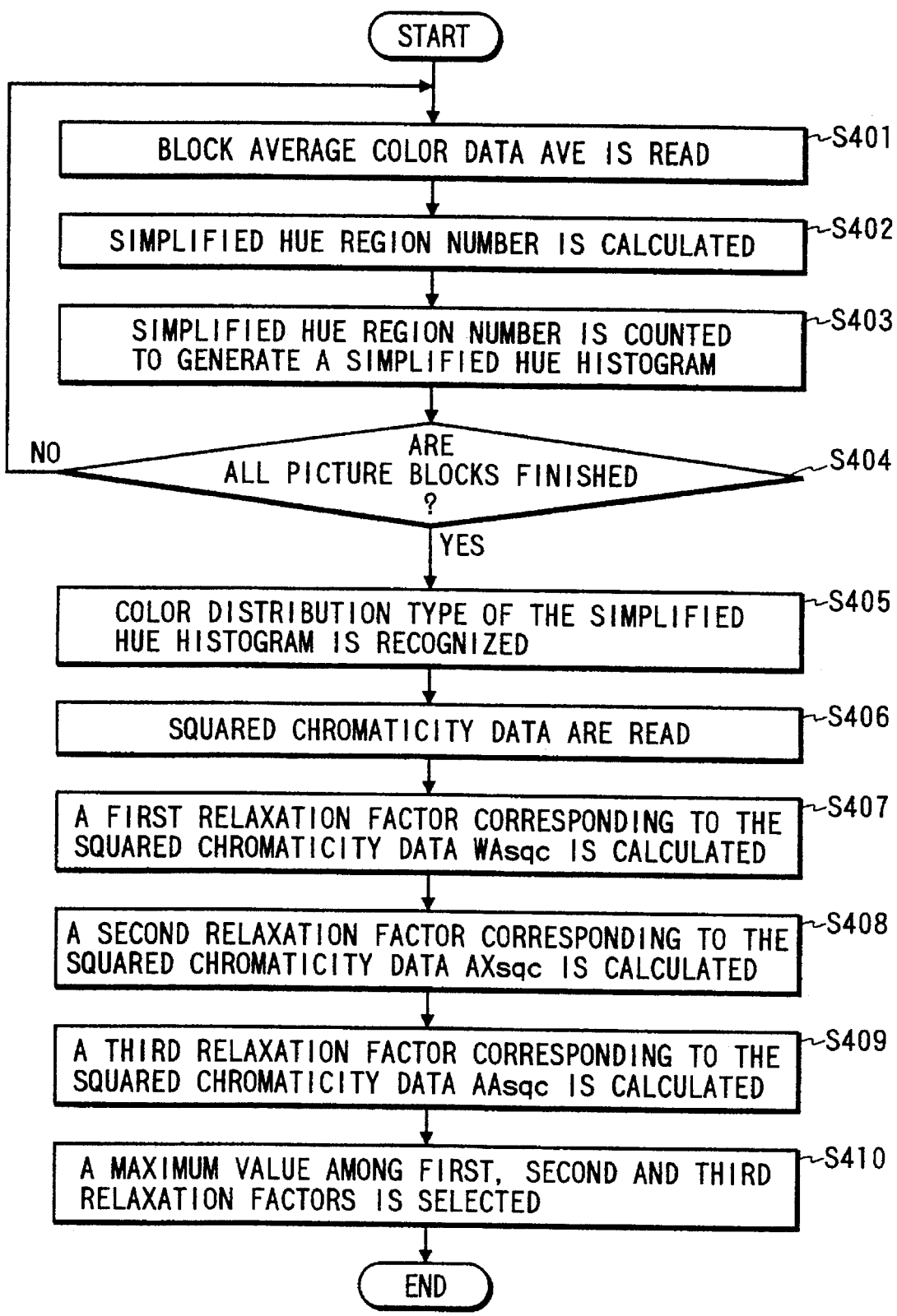
FIG. 11 is a flow chart showing the operation performed in the relaxation factor calculating unit shown in FIG. 10.

FIG. 10 is a block diagram of the relaxation factor calculating unit 21. FIG. 11 is a flow chart showing the operation of the relaxation factor calculating unit 21.

As shown in FIG. 10, the relaxation factor calculating unit 21 comprises a simplified hue histogram generating unit 51 for generating a simplified hue histogram from the block average color data AVE transferred from the white balance information storing unit 16, a histogram type recognizing unit 52 for recognizing a color distribution type of the simplified hue histogram by distinguishing a distribution condition of six types of simplified hue region numbers Hhum in the simplified hue histogram, a first relaxation factor calculating unit 53 for calculating a first relaxation factor for the block maximum-luminance average color data WPave according to the recognition in the histogram type recognizing unit 52 and the squared chromaticity data WAsqc of the block maximum-luminance average color data WPave, a second relaxation factor calculating unit 54 for calculating a second relaxation factor for the block average color maximum-luminance data AVEmax according to the recognition in the histogram type recognizing unit 52 and the squared chromatic data AXsqc of the block average color maximum-luminance data AVEmax, a third relaxation factor calculating unit 55 for calculating a third relaxation factor for the picture average color data AVEave according to the recognition in the histogram type recognizing unit 52 and the squared chromaticity data AAsqc of the picture average color data AVEave, and a maximum value selecting unit 56 for selecting a maximum value from among the first, second and third relaxation factors as a final relaxation factor and outputting the final relaxation factor to the white balance coefficient calculating unit 22.

In the above configuration, the operation of the calculating unit 21 is described with reference to FIGS. 10 and 11.

In a step S401, a piece of block average color data AVE for a picture block (m,n) stored in the white balance information storing unit 16 is read in the simplified hue histogram generating unit 51. Thereafter, in a step S402, a simplified hue region number Hnum which corresponds to the block average color data AVE and is allocated for one of the simplified hue regions shown in FIG. 6 is calculated in the generating unit 51. Thereafter, in a step S403, the simplified hue region number Hnum corresponding to the block average color data AVE is counted to generate a simplified hue histogram. The procedure of the steps S401 to S403 are repeated until the simplified hue region numbers Hnum corresponding to the block average color data AVE for all of the picture blocks are counted. Therefore, the simplified hue histogram in which the number of counting times (or the frequency) for each of six types of simplified hue region numbers Hnum (Hnum=0,1,- - -,5) is indicated is generated for the block average color data AVE.

Thereafter, when the block average color data AVE for all of the picture blocks are read in the generating unit 51 (step S404), a distribution condition of six types of simplified hue region numbers Hnum in the simplified hue histogram is examined in the histogram type recognizing unit 52 (step S405). By examining the frequency for each type of simplified hue region number Hnum except for an chromatic color (Hhum=6), a color distribution type of the simplified hue histogram can be distinguished, and a color distribution of the colored picture can be determined. In this embodiment, a color distribution of the colored picture in which colors are concentrated into a particular hue to make difficult the calculation of the color distribution axis is detected by distinguishing a color distribution type of the simplified hue histogram. In cases where the frequency of a type of simplified hue region numbers is higher than a threshold or the frequency for each of two types of simplified hue region numbers corresponding to two simplified hue regions adjacent to each other is higher than a threshold, the simplified hue histogram is classified into an uneven color distribution type.

Figure 12:
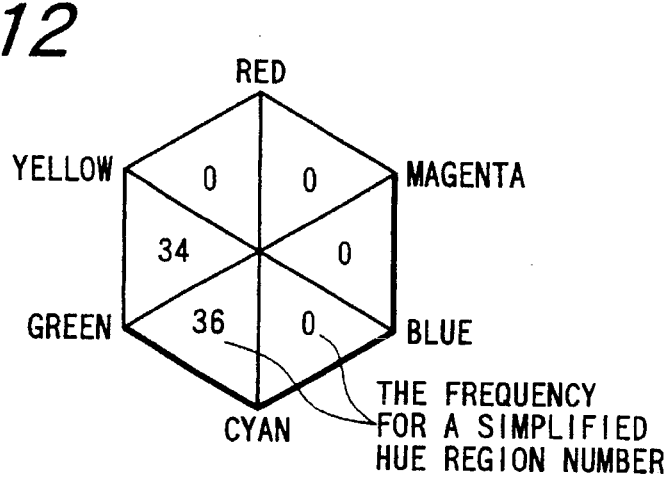
FIG. 12 shows an example of a color distribution of picture blocks of a colored picture of which hue is one-sided to green.

For example, as shown in FIG. 12, in cases where a colored picture indicates a scene of a forest, two simplified hue region numbers corresponding to two simplified hue regions around green are higher than a threshold, and the simplified hue histogram for the colored picture indicating the forest scene is recognized as the uneven color distribution type in the recognizing unit 52. In this case, because colors of a plurality of pixels of the colored picture are locally distributed around a particular color, a second-stage color distribution axis detected in the detecting unit 20 is greatly inclined toward the particular color such as green, and colors of many pixels change toward a complementary color of green as a result of the white balance adjustment. Therefore, in this embodiment, a relaxation factor having a high value is set in the relaxation factor calculating unit 21 to decrease a degree of the white balance adjustment.

Figure 13:
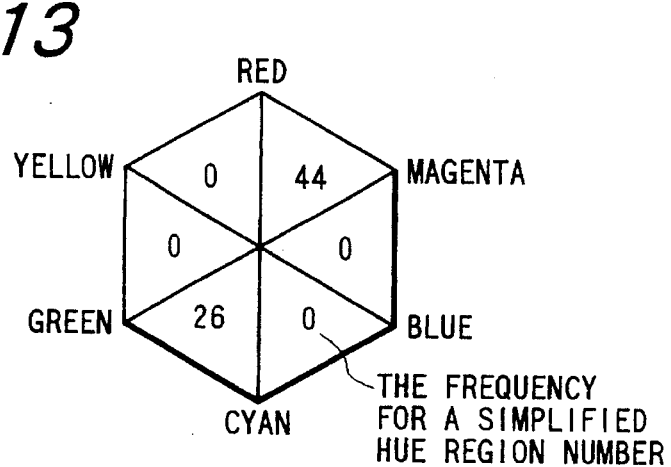
FIG. 13 shows an example of a color distribution of picture blocks of a colored picture in which a pair of colors having a complementary color relationship exist.

Also, as shown in FIG. 13, in cases where the frequency for each of two types of simplified hue region numbers corresponding to two simplified hue regions diagonally placed each other is higher than a threshold and the frequency for each of other types of simplified hue region numbers is lower than the threshold, the simplified hue histogram is recognized as the uneven color distribution type in the recognizing unit 52. That is, a color distribution of a colored picture is one-sided to a pair of simplified hue regions having a complementary color relationship, and it is easy that the second-stage color distribution axis is erroneously detected in the detecting unit 20. In cases where the simplified hue histogram is not classified into the uneven color distribution type, the simplified hue histogram is classified into a normal color distribution type.

For example, in cases where a distribution of colors of the pixels in the colored picture is not one-sided, the simplified hue histogram is recognized as the normal color distribution type in the recognizing unit 52, and the color distribution axis can be detected without being inclined to a particular color. Therefore, when the simplified hue histogram is classified into the normal color distribution type, a relaxation factor having a low value is set in the white balance coefficient calculating unit 22 not to decrease a degree of the white balance adjustment.

In detail, the color distribution type of the simplified hue histogram generated in the unit 51 is judged by considering to which simplified hue regions the block average color data AVE are placed. In this case, though the frequency of each of six types of simplified hue region numbers Hnum in the simplified hue histogram is not considered, it is considered whether or not the frequency of each of six types of simplified hue region numbers Hnum is higher than a variable lower limit threshold Th-hue. The variable lower limit threshold Th-hue is determined as follows.

$$Th\text{-}hue = Nblock/(2*Nhue)$$

Here, Nblock denotes the number of picture blocks, and Nhue denotes the number ($0 \leq Nhue \leq 6$) of simplified hue regions in which one or more pieces of block average color data AVE are placed.

The reason that the variable lower limit threshold Th–hue is considered for the frequency for each of six types of simplified hue region numbers Hnum is described with reference to a simplified hue histogram shown in Table 1.

TABLE 1

| simplified hue region numbers Hnum | 0 | 1 | 2 | 3 | 4 | 5 | 6 |
|---|---|---|---|---|---|---|---|
| The frequency in simplified hue histogram | 11 | 0 | 0 | 0 | 1 | 58 | 0 |

(Hnum = 6 denote an achromatic color)

As shown in Table 1, because a color distribution of a colored picture is one-sided to zero-th and fifth simplified hue regions (Hnum=0 and Hnum=5), colors of the colored picture are one-sided around red. In this case, white balance coefficients calculated according to a second-stage color distribution axis for the colored picture in the calculating unit 22 become easily heightened., and colors of many pixels of the colored picture change toward cyan which is a complementary color of red. To prevent the change of colors to those complementary colors, it is required to recognize the simplified hue histogram as the uneven color distribution type in the recognizing unit 52. However, because the frequency at the fourth simplified hue region (Hnum=4) is 1, the simplified hue histogram is undesirably recognized as the uneven color distribution type in cases where the judgement whether or not each of six types of simplified hue region numbers Hnum is counted is performed.

In this embodiment, because the judgement whether or not the frequency of each of six types of simplified hue region numbers Hnum is higher than the variable lower limit threshold Th-hue is performed, features of the color distribution of the colored picture are roughly detected, and the color distribution type of the simplified hue histogram can be appropriately recognized. For example, in case of Nblock=70 and Nhue=3, Th-hue≈11 is obtained, and the frequency at the fourth simplified region (Hhue=4) is not considered. Therefore, the simplified hue histogram is recognized as the uneven color distribution type in the recognizing unit 52.

Also, because the variable lower limit threshold Th-hue depending on the number of simplified hue regions in which one or more pieces of block average color data AVE are placed is variable, the judgement based on the variable lower limit threshold Th-hue is performed by considering a spreading degree of the color distribution of the colored picture.

Thereafter, in a step S406 of FIG. 11, the squared chromaticity data WAsqc of the block maximum-luminance average color data WPave is transferred from the storing unit 16 to the first relaxation factor calculating unit 53, the squared chromatic data AXsqc of the block average color maximum-luminance data AVEmax is transferred from the storing unit 16 to the second relaxation factor calculating unit 54, and the squared chromaticity data AAsqc of the picture average color data AVEave is transferred from the storing unit 16 to the third relaxation factor calculating unit 55.

Thereafter, a first relaxation factor corresponding to the squared chromaticity data WAsqc is calculated in the calculating unit 53 (step S407), a second relaxation factor corresponding to the squared chromatic data AXsqc is calculated in the calculating unit 54 (step S408), and a third relaxation factor corresponding to the squared chromaticity data AAsqc is calculated in the calculating unit 55 (step S409). In detail, each of the relaxation factors Frlx ranges from 0 to 1024, and a relaxation degree of each relaxation factor Frlx for relaxing white balance coefficients calculated in the calculating unit 22 is enlarged as a value of each relaxation factor Frlx is increased. That is, in case of a relaxation factor Frlx=0, any relaxation for white balance coefficients is not performed, and white balance coefficients calculated from the second-stage color distribution axis are adopted in the calculating unit 22 as it is. In contrast, the higher the relaxation factor Frlx, the stronger the relaxation for the white balance coefficients. In case of the relaxation factor Frlx=1024, any white balance adjustment is not performed in the adjusting unit 14.

Figure 14:
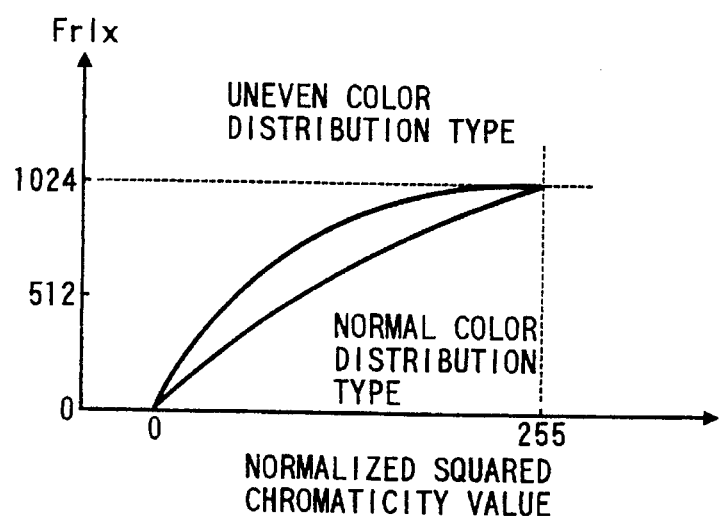
FIG. 14 shows a relationship between a normalized squared chromaticity value and a relaxation factor.

FIG. 14 shows a relationship between a normalized squared chromaticity value and a relaxation factor. A value of each of the squared chromaticity data WAsqc, AXsqc and AAsqc is normalized in a range from 0 to 255.

As shown in FIG. 14, because the influence of a chromatic colored object in a colored picture on the second-stage color distribution axis detected in the detecting unit 20 is increased as a value of the squared chromaticity data is heightened, a relaxation factor Frlx is set to a high value to weaken a relaxation degree of the relaxation factor Frlx for the white balance coefficients. Also, a relationship between a normalized squared chromaticity value and a relaxation factor in case of the simplified hue histogram recognized as the normal color distribution type differs from that in case of the simplified hue histogram recognized as the uneven color distribution type. That is, a relaxation factor for the normal color distribution type of simplified hue histogram is always higher than that for the uneven color distribution of simplified hue histogram, and two types of relaxation factors are formulated as follows by using a pair of monotonic increase functions as normalized relaxation factor curves. For normal color distribution type of simplified hue histogram:

$$Frlx = 1024 * \{1 - ((256 - Xn)/256)^2\}$$

For uneven color distribution type of simplified hue histogram:

$$Frlx = 1024 * \{1 - ((256 - Xn)/256)^4\}$$

In this embodiment, the above monotonic increase functions are used to determine the normalized relaxation factor curves. However, any other monotonic increase functions are applicable on condition that a relaxation factor for the normal color distribution type of simplified hue histogram is always higher than that for the uneven color distribution type of simplified hue histogram. Also, it is applicable that the relationship between the normalized squared chromaticity value and the relaxation factor be stored in tabular form.

In each of the calculating units 53 to 55, one of the normalized relaxation factor curves is selected according to a color distribution type of the simplified hue histogram recognized in the recognizing unit 52, and a value of the relaxation factor is effective in a range from a lower limit to an upper limit for each of the squared chromaticity data. In this embodiment, an upper limit WAch, a first lower limit WAncl and a second lower limit WAucl are defined for the squared chromaticity data WAsqc, an upper limit AXch, a first lower limit AXncl and a second lower limit AXucl are defined for the squared chromaticity data AXsqc, and an upper limit AAch, a first lower limit AAncl and a second lower limit AAucl are defined for the squared chromaticity data AAsqc. Each of the upper limits is used for both the color distribution types of the simplified hue histogram, each of the first lower limits is used for the normal color distribution type of the simplified hue histogram, and each of the second lower limits is used for the uneven color distribution type of the simplified hue histogram. Also, $$WAch > WAncl \geq WAucl$$

$$AXch > AXncl \geq AXucl$$

$$AAch > AAncl \geq AAucl$$

are satisfied. Therefore, a relaxation degree of the relaxation factor in case of the normal color distribution type is larger than that in case of the uneven color distribution. In addition, $$AXncl \geq WAncl \geq AAncl$$

$$AXucl \geq WAucl \geq AAucl$$

$$AXch \geq WAch \geq AAch$$

is satisfied. Therefore, the chromaticity data AVEave, WPave and AVEmax are regarded as important in that order, and the influence of the chromaticity data AVEave, WPave and AVEmax on the relaxation factor is large in that order. The reason is that the indication of the chromaticity of the colored picture by the chromaticity data AVEave and WPave is larger than that by the chromaticity data AVEmax and the influence of the chromaticity data AVEave on the white balance adjustment is larger than that of the chromaticity data AVEmax. Also, by changing the upper and lower limits for the squared chromaticity data, a degree of the white balance adjustment can be adjusted in some degree.

In this embodiment, the lower limits for the squared chromaticity data are set to 0 and the upper limit for the squared chromaticity data is set to 255. When a value of the squared chromaticity data is lower than the lower limit, a relaxation factor Frlx=0 is set, and a relaxation factor Frlx=1024 is set when a value of the squared chromaticity data is higher than the upper limit. For example, a normalized value NWAsqc of the squared chromaticity data WAsqc of which a value is placed between the lower and upper limits is calculated as follows.

$$NWAsqc=256*(WAsqc-WAcl)/(WAch-WAcl)$$

Here, WAsqc denotes a value of the squared chromaticity data, WAcl denotes a lower limit of the squared chromaticity data WAsqc, and WAch denotes an upper limit of the squared chromaticity data WAsqc. A first relaxation factor Frlx-WA for the normalized value NWAsqc of the squared chromaticity data WAsqc is calculated as follows.

$$Frlx-WA=1024*\{1-((256-NWAsqc)/256)^2\}$$

Thereafter, in a step S410 of FIG. 11, a maximum value among the first, second and third relaxation factors is selected as a final relaxation factor in the maximum value selecting unit 56. The reason that three types of relaxation factors are calculated and one of the relaxation factors is selected is described. It is adequate to use chromaticity information of a colored picture as a leading indication for the white balance adjustment. However, the subjectivity of a viewer for the white balance in a colored picture cannot be expressed by using one parameter representing the chromaticity information. In this embodiment, three types of data WPave, AVEmax and AVEave respectively indicating a color feature of the entire colored picture are used as a leading indication for the white balance adjustment of the colored picture. Also, to decrease a probability that a relaxation factor is erroneously calculated in the calculating unit 21, a maximum value among the first, second and third relaxation factors is selected as a final relaxation factor. However, it is applicable that a final relaxation factor be determined by using one type of squared chromaticity data WPave, AVEmax or AVEave for convenience.

After the step S106 of FIG. 3, a set of white balance coefficients is calculated in a step S107. In cases where the first white balance adjustment mode is selected in the white balance mode setting unit 19 (step S104), a set of white balance coefficients is calculated by using the RGB values (WXr, WXg, WXb) or (AXr, AXg, AXb) of the white region data Dwr transferred from the white region judging and detecting unit 18. Also, in cases where the second white balance adjustment mode is selected, a set of white balance coefficients is calculated by using the RGB values (WBr, WBg, WBb) of the second-stage color distribution axis vector obtained in the color distribution axis detecting unit 20.

Also, in cases where the third white balance adjustment mode is selected, a set of white balance coefficients is calculated by using the RGB values (WXr, WXg, WXb) of the white region data Dwr and the RGB values (WBr, WBg, WBb) of the second-stage color distribution axis vector. That is, a final color distribution axis vector (WBfr, WBfg, WBfb) is calculated by averaging the RGB values (WXr, WXg, WXb) and the RGB values (WBr, WBg, WBb).

$$WBfr=(WBr+WXr)/2$$

$$WBfg=(WBg+WXg)/2$$

$$WBfb=(WBb+WXb)/2$$

However, to again judge whether or not the white region data Dwr is to be considered for the white balance adjustment, it is applicable that the second-stage color distribution axis vector itself be used as the final color distribution axis vector in cases where a distance between the second-stage color distribution axis and the picture maximum-luminance data WPmax is lower than a prescribed threshold.

$$(Dis-WB-WX)^{1/2} > (WXJth)^{1/2}$$

Here, Dis–WB–WX is a squared distance between the second-stage color distribution axis and the picture maximum-luminance data WPmax, and WXJth is a squared threshold.

In cases where a set of white balance coefficients (or a set of RGB amplification gains) for colors of the pixels of the colored picture is calculated in the step S107 by using the white region data Dwr(WXr, WXg, WXb) or (AXr, AXg, AXb), a set of white balance coefficients (WBkr, WBkg, WBkb) is determined as follows.

$$Y=0.3*WXr+0.59*WXg+0.11*WXb$$

$$WBkr=Y/WXr$$

$$WBkg=Y/WXg$$

$$WBkb=Y/WXb$$

or, $$Y=0.3*AXr+0.59*AXg+0.11*AXb$$

$$WBkr=Y/AXr$$

$$WBkg=Y/AXg$$

$$WBkb=Y/AXb$$

In cases where a set of white balance coefficients is calculated in the step S107 by using the second-stage color distribution axis vector (WBr, WBg, WBb), a set of pre-relaxation white balance coefficients (WBkr-pr, WBkg-pr, WBkbpr) is first determined as follows.

$$Y=0.3*WBr+0.59*WBg+0.11*WBb$$

$$WBkr-pr=Y/WBr$$

$$WBkg-pr=Y/WBg$$

$$WBkb-pr=Y/WBb$$

Thereafter, a set of white balance coefficients (WBkr, WBkg, WBkb) is determined by considering the relaxation factor Frlx for the set of pre-relaxation white balance coefficients.

$$WBkr=1.0+(WBkr-pr-1.0)*(1024-Frlx)/1024$$

$$WBkg=1.0+(WBkg-pr-1.0)*(1024-Frlx)/1024$$

$$WBkb=1.0+(WBkb-pr-1.0)*(1024-Frlx)/1024$$

Therefore, each of the white balance coefficients varies around 1, and a variation value of each white balance coefficient from 1 is compressed by (1024–Frlx)/1024. In other words, an angle between the second-stage color distribution axis and an achromatic color axis of the RGB color space is substantially decreased by the relaxation factor Frlx. The relaxation of the white balance adjustment is performed in cases where the white balance coefficients are calculated by using the second-stage color distribution axis detected, and the relaxation of the white balance adjustment is not performed in cases where the white balance coefficients are calculated by using the white region data based on the detection of the white region.

Also, the relaxation of the white balance adjustment is performed by using the relaxation factor to prevent the deterioration of a picture quality such as a fading in the colored picture resulting from an erroneous detection of a color distribution axis. However, there is a probability that a white balance coefficient is too high even though the white balance adjustment is relaxed. To prevent an erroneous detection of a color distribution axis, each of the white balance coefficients is set in an allowable range from 0.75 to 1.25. That is, in cases where at least one of the white balance coefficients is out of the allowable range, the white balance coefficients are compressed or expanded to set a white balance coefficient farthest from the allowable range in the allowable range.

In detail, a lower-side difference Dlow between a white balance coefficient having a minimum value among the white balance coefficients WBkr, WBkg and WBkb and a lower limit Ll=0.75 and an upper-side difference Dupp between a white balance coefficient having a maximum value and an upper limit Lu=1.25 are calculated.

$$Dlow=Ll-min(WBkr, WBkg, WBkb)$$

$$Dupp=max(WBkr, WBkg, WBkb)-Lu$$

In cases where a higher one between the differences Dlow and Dupp is higher than zero, at least one of the white balance coefficients is out of the allowable range. Therefore, in cases where a white balance coefficient farthest from the allowable range is higher than the upper limit Lu, off-center values defined as differences between values of the white balance coefficients and (Lu+Ll)/2 are equally compressed to set the white balance coefficient farthest from the allowable range to the upper limit Lu=1.25. Also, in cases where a white balance coefficient farthest from the allowable range is lower than the lower limit L1, the off-center values are equally compressed to set the white balance coefficient farthest from the allowable range to the lower limit L1=0.75.

$$Max-D=max(Dlow, Dup)$$

if Max-D>0, $$Max-off=Hv+Max-D$$

$$WBkr\text{-}limited=(Lu+Ll)/2+\{WBkr-(Lu+Ll)/2\}*Hv/Max\text{-}off$$

$$WBkg\text{-}limited=(Lu+Ll)/2+\{WBkg-(Lu+Ll)/2\}*Hv/Max\text{-}off$$

$$WBkb\text{-}limited=(Lu+Ll)/2+\{WBkb-(Lu+Ll)/2\}*Hv/Max\text{-}off$$

Here, Max-off denotes a maximum off-center value defined as a difference between a white balance coefficient farthest from the allowable range and (Lu+Ll)/2, Hv denotes a half value (Hv=½) of a difference between the upper and lower limits, and (WBkr-limited, WBkg-limited, WBkb-limited) denotes a set of white balance coefficients limited between the upper and lower limits.

After the white balance coefficients limited are calculated in the white balance coefficient calculating unit 22 (step S107), the white balance adjustment is performed in the adjusting unit 14 to change RGB values Pr, Pg and Pb of the pixels of the colored picture to adjusted RGB values Par, Pag and Pab by using the white balance coefficients limited.

$$Par=Pr*WBkr\text{-}limited$$

$$Pag=Pg*WBkg\text{-}limited$$

$$Pab=Pb*WBkb\text{-}limited$$

Accordingly, because the set of white balance coefficients is calculated in the white balance coefficient calculating unit 22 while considering the detecting result of the white region detected from the colored picture as a basis of the white balance adjustment and the second-stage color distribution axis detected in the three-dimensional color space in the detecting unit 20, the white balance adjustment adapted to color features of each of colored pictures can be performed.

Also, because the detection of the second-stage color distribution axis is performed in the color distribution axis detecting unit 20 by performing the axis detection in two stages to remove the influence of a high chromatic colored object in the colored picture on the detection of the color distribution axis, an erroneous detection of the color distribution axis can be prevented. Also, as compared with a conventional white balance adjustment in which amplification gains of color difference signals obtained by integrating the difference color signals in a video camera or the like are calculated, a white balance adjustment according to the present invention can be performed with a higher accuracy.

Also, in the white balance adjustment performed by using the color distribution axis detected in the detecting unit 20, the color information (or the white balance information) of the colored picture are extracted from the picture data in the extracting unit 15, the relaxation factor for relaxing the white balance adjustment is calculated from the color information in the calculating unit 21, and the set of white balance coefficients is calculated in the calculating unit 22 while considering the relaxation factor. Therefore, a degree of the white balance adjustment can be controlled according to the influence of a chromatic colored object on the color distribution axis, the deterioration of a picture quality such as a fading caused by an erroneous detection of the color distribution axis can be prevented in advance, and the white balance adjustment can be reliably performed.

In addition, in cases where a one-sided color distribution of the colored picture is detected because the color distribution is mainly one-sided to one hue region or two hue regions adjacent to each other or having a complementary relationship when a color distribution of the simplified hue histogram generated in the generating unit 51 is judged in the recognizing unit 52, the relaxation factor is calculated in the calculating unit 21 to decrease the degree of the white balance adjustment performed in the adjusting unit 14. Therefore, it can be prevented that a color of an object placed in a major portion of the colored picture changes to its complementary color, and it can be prevented that a viewer feels strange for colors of a colored picture.

In this embodiment, the second-stage color distribution axis (or the white balance axis) is detected in the RGB color space. However, it is applicable that the axis be detected in a luminance and color difference space. In this case, a two-dimensional histogram in a luminance Y and a color difference (R-Y) plane and another two-dimensional histogram in a luminance Y and a color difference (B-Y) plane are calculated in place of the GR and GB two-dimensional histograms.

Also, the detection of the white region in the detecting unit 18, the detection of the color distribution axis in the detecting unit 20, the calculation of the relaxation factor in the calculating unit 21, the recognition of the color distribution of the colored picture according to the simplified hue histogram in the recognizing unit 52, the detection of the removing picture block in the detecting unit 34 and the like are performed in this embodiment. However, it is applicable that some of the units be combined.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An apparatus for calculating a degree of white balance adjustment for a colored picture, comprising:

white balance information extracting means for partitioning a colored picture into a plurality of picture blocks respectively having a uniform size and extracting one or more pieces of white balance information, which each indicates one or more color features of one picture block or one or more color features of the colored picture, from pieces of picture data corresponding to pixels of the colored picture;

white region judging and detecting means for judging whether or not a white region having a low chromaticity exists in one of the picture blocks according to the white balance information extracted in the white balance information extracting means and detecting the white region as a basis of white in a white balance adjustment for the colored picture in cases where the white region exists in one of the picture blocks;

color distribution axis detecting means for detecting a color distribution axis extending from an original point of a three-dimensional color space to a gravity center of a color distribution of the colored picture according to the white balance information extracted in the white balance information extracting means;

white balance coefficient calculating means for calculating a white balance coefficient denoting an amplification gain for colors of pixels of the colored picture according to a color of the white region detected in the white region judging and detecting means in cases where it is judged that the white region exists in one of the picture blocks or according to the color distribution axis detected in the color distribution axis detecting means; and relaxation factor calculating means for calculating a relaxation factor to relax the influence of the color distribution axis detected in the color distribution axis detecting means on the white balance coefficient calculated in the white balance coefficient calculating means, a difference between the white balance coefficient and 1.0 being reduced according to the relaxation factor.

2. An apparatus according to claim 1 in which the white balance information extracted in the white balance information extracting means comprises pieces of block maximum-luminance data WP respectively indicating a color of a maximum-luminance pixel of which a luminance value is the largest among those of pixels in one picture block and a piece of picture maximum-luminance data WPmax indicating a color of a particular maximum-luminance pixel of which a luminance value is the largest among those of maximum-luminance pixels, and it is judged in the white region judging and detecting means that a pixel or a picture block corresponding to the picture maximum-luminance data WPmax is a white region used as a basis of white in a white balance adjustment for the colored picture in cases where a piece of picture data placed farthest from the original point of the three-dimensional color space among the picture data placed in the color distribution of the colored picture agrees with the picture maximum-luminance data WPmax and a luminance value of the picture maximum-luminance data WPmax is higher than a threshold.

3. An apparatus according to claim 1 in which the white balance information extracted in the white balance information extracting means comprises pieces of block average color data AVE respectively indicating an average luminance value, an average first color difference value and an average second color difference value of an average pixel among luminance values, a piece of block average color maximum-luminance data AVEmax indicating an average luminance value, an average first color difference value and an average second color difference value of a particular average pixel of which a luminance value is the largest among the average luminance values of the average pixels, and it is judged in the white region judging and detecting means that a pixel or a picture block corresponding to the block average color maximum-luminance data AVEmax is a white region used as a basis of white in a white balance adjustment for the colored picture in cases where a chromaticity of the block average color maximum-luminance data AVEmax is lower than a threshold.

4. An apparatus according to claim 1 in which the color distribution axis detecting means comprises:

first-stage color distribution axis calculating means for calculating a first two-dimensional color distribution axis indicating a one-sided condition of a first two-dimensional color distribution obtained by projecting the color distribution of the colored picture onto a first two-dimensional color plane, calculating a second two-dimensional color distribution axis indicating a one-sided condition of a second two-dimensional color distribution obtained by projecting the color distribution of the colored picture onto a second two-dimensional color plane and calculating a first-stage color distribution axis in the three-dimensional color space by synchronizing the first two-dimensional color distribution axis and the second two-dimensional color distribution axis; and second-stage color distribution axis calculating means for selecting pieces of inside white balance information, which exist in a cylindrical space having the first-stage color distribution axis as a central axis in the three-dimensional color space, from the white balance information which are extracted in the white balance information extracting means and indicate the color features of the picture blocks and calculating a second-stage color distribution axis extending from the original point of the three-dimensional color space to a gravity center of the inside white balance information as the color distribution axis detected in the color distribution axis detecting means.

5. An apparatus according to claim 4 in which the first-stage color distribution axis calculating means comprises:

first two-dimensional histogram calculating means for calculating a first two-dimensional histogram quantitatively indicating the first two-dimensional color distribution;

second two-dimensional histogram calculating means for calculating a second two-dimensional histogram quantitatively indicating the second two-dimensional color distribution;

first two-dimensional color distribution axis calculating means for calculating the first two-dimensional color distribution axis according to the first two-dimensional histogram calculated in the first two-dimensional histogram calculating means;

second two-dimensional color distribution axis calculating means for calculating the second two-dimensional color distribution axis according to the second two-dimensional histogram calculated in the second two-dimensional histogram calculating means; and three-dimensional color distribution axis generating means for generating the first-stage color distribution axis by synchronizing the first two-dimensional color distribution axis calculated in the first two-dimensional color distribution axis calculating means and the second two-dimensional color distribution axis calculated in the second two-dimensional color distribution axis calculating means.

6. An apparatus according to claim 5, the first-stage color distribution axis calculating means further comprising:

angle storing means for storing a plurality of first angles respectively corresponding to a first referential position indicated by two types of variables of the first two-dimensional histogram and storing a plurality of second angles respectively corresponding to a second referential position indicated by two types of variables of the second two-dimensional histogram, each first angle being defined as an angle between a line connecting one first referential position and an original point of the first two-dimensional color plane and an co-ordinate axis of the first two-dimensional color plane, and each second angle being defined as an angle between a line connecting one second referential position and an original point of the second two-dimensional color plane and an co-ordinate axis of the second two-dimensional color plane; and weighting factor storing means for storing a plurality of weighting factors corresponding to the first and second angles stored in the angle storing means, a value of each weighting factor being decreased as the first or second angle becomes far from an angle of 45 degrees, wherein a plurality of first angles corresponding to first positions indicated by a plurality of sets of variables of the first two-dimensional histogram are weighted with weighting factors corresponding to the first angles in the first two-dimensional color distribution axis calculating means to generate a plurality of first weighted angles, an angle between the first two-dimensional color distribution axis and the co-ordinate axis of the first two-dimensional color plane is set to a first weighted average angle determined by averaging the first weighted angles in the first two-dimensional color distribution axis calculating means, a plurality of second angles corresponding to second positions indicated by a plurality of sets of variables of the second two-dimensional histogram are weighted with weighting factors corresponding to the second angles in the second two-dimensional color distribution axis calculating means to generate a plurality of second weighted angles, and an angle between the second two-dimensional color distribution axis and the co-ordinate axis of the second two-dimensional color plane is set to a second weighted average angle determined by averaging the first weighted angles in the second two-dimensional color distribution axis calculating means.

7. An apparatus according to claim 4 in which the first-stage color distribution axis calculating means comprises:

removing block detecting means for detecting a picture block, which is partitioned in the white balance information extracting means and has a uniform chromatic color, as a removing picture block;

first two-dimensional histogram calculating means for calculating a first two-dimensional histogram quantitatively indicating a first two-dimensional processed color distribution obtained by projecting a processed color distribution of the picture blocks of the colored picture except for the removing picture block detected in the removing block detecting means onto the first two-dimensional color plane;

second two-dimensional histogram calculating means for calculating a second two-dimensional histogram quantitatively indicating a second two-dimensional processed color distribution obtained by projecting the processed color distribution onto the second two-dimensional color plane;

first two-dimensional color distribution axis calculating means for calculating the first two-dimensional color distribution axis according to the first two-dimensional histogram calculated in the first two-dimensional histogram calculating means;

second two-dimensional color distribution axis calculating means for calculating the second two-dimensional color distribution axis according to the second two-dimensional histogram calculated in the second two-dimensional histogram calculating means; and three-dimensional color distribution axis generating means for generating the first-stage color distribution axis by synchronizing the first two-dimensional color distribution axis calculated in the first two-dimensional color distribution axis calculating means and the second two-dimensional color distribution axis calculated in the second two-dimensional color distribution axis calculating means.

8. An apparatus according to claim 7 in which the white balance information extracted in the white balance information extracting means comprises a piece of block average color data AVE indicating an average luminance value, an average first color difference value and an average second color difference value of an average pixel among luminance values, first color difference values and second color difference values of pixels in a particular picture block and a piece of block minimum-luminance data BP indicating a color of a minimum-luminance pixel of which a luminance value is the smallest among those of pixels in the same particular picture block, and the particular picture block is detected as the removing picture block in the removing block detecting means in cases where a difference between the average luminance value of the block average color data AVE and the luminance value of the block minimum-luminance data BP is lower than a first threshold, a chromaticity of the block average color data AVE and a chromaticity of the block minimum-luminance data BP are respectively equal to or higher than a second threshold, and a difference between a hue value of the block average color data AVE and a hue value of the block minimum-luminance data BP is lower than a third threshold.

9. An apparatus according to claim 7, the first-stage color distribution axis calculating means further comprising:

angle storing means for storing a plurality of first angles respectively corresponding to a first referential position indicated by two types of variables of the first two-dimensional histogram and storing a plurality of second angles respectively corresponding to a second referential position indicated by two types of variables of the second two-dimensional histogram, each first angle being defined as an angle between a line connecting one first referential position and an original point of the first two-dimensional color plane and an co-ordinate axis of the first two-dimensional color plane, and each second angle being defined as an angle between a line connecting one second referential position and an original point of the second two-dimensional color plane and an co-ordinate axis of the second two-dimensional color plane; and weighting factor storing means for storing a plurality of weighting factors corresponding to the first and second angles stored in the angle storing means, a value of each weighting factor being decreased as the first or second angle becomes far from an angle of 45 degrees, wherein a plurality of first angles corresponding to first positions indicated by a plurality of sets of variables of the first two-dimensional histogram are weighted with weighting factors corresponding to the first angles in the first two-dimensional color distribution axis calculating means to generate a plurality of first weighted angles, an angle between the first two-dimensional color distribution axis and the co-ordinate axis of the first two-dimensional color plane is set to a first weighted average angle determined by averaging the first weighted angles in the first two-dimensional color distribution axis calculating means, a plurality of second angles corresponding to second positions indicated by a plurality of sets of variables of the second two-dimensional histogram are weighted with weighting factors corresponding to the second angles in the second two-dimensional color distribution axis calculating means to generate a plurality of second weighted angles, and an angle between the second two-dimensional color distribution axis and the co-ordinate axis of the second two-dimensional color plane is set to a second weighted average angle determined by averaging the first weighted angles in the second two-dimensional color distribution axis calculating means.

10. An apparatus according to claim 4 in which the white balance information extracted in the white balance information extracting means comprises pieces of block maximum-luminance data WP respectively indicating a color of a maximum-luminance pixel of which a luminance value is the largest among those of pixels in one picture block and pieces of block average color data AVE respectively indicating an average luminance value, an average first color difference value and an average second color difference value of an average pixel among luminance values, first color difference values and second color difference values of pixels in one picture block, and the second-stage color distribution axis calculating means comprises:

WP data gravity center calculating means for calculating a WP gravity center of pieces of inside block maximum-luminance data WP which are selected from the block maximum-luminance data WP extracted in the white balance information extracting means and are placed in the cylindrical region of the three-dimensional color space;

AVE data gravity center calculating means for calculating a AVE gravity center of pieces of inside block minimum-luminance data AVE which are selected from the block minimum-luminance data AVE extracted in the white balance information extracting means and are placed in the cylindrical region of the three-dimensional color space; and average value calculating means for calculating an average position of the WP gravity center calculated in the WP data gravity center calculating means and AVE gravity center calculated in the AVE data gravity center calculating means, the second-stage color distribution axis being defined as a line segment extending from the original point of the three-dimensional color space to the average position.

11. An apparatus according to claim 1 in which the relaxation factor calculating means comprises:

a plurality of relaxation factor calculating units for respectively calculating a relaxation factor of which a value is set according to a chromaticity value of a piece of white balance information which indicates color features of the colored picture and is extracted in the white balance information extracting means; and a maximum value selecting unit for selecting one relaxation factor having a maximum value from among the relaxation factors calculated in the relaxation factor calculating units as the relaxation factor calculated in the relaxation factor calculating means.

12. An apparatus according to claim 1 in which the relaxation factor calculating means comprises:

a hue histogram generating unit for preparing six hue regions partitioned by red, yellow, green, cyan, blue and magenta in that order and arranged in a cyclic form and generating a hue histogram having six hue variables which each designate the number of pieces of white balance information which are extracted in the white balance information extracting means for each picture block and are placed in the same hue region;

a histogram type recognizing unit for recognizing whether or not a color distribution of the colored picture is one-sided according to a distribution condition of the hue variables of the hue histogram generated in the hue histogram generating unit;

a plurality of relaxation factor calculating units for respectively calculating a relaxation factor of which a value is set according to the recognition of the color distribution of the colored picture performed in the histogram type recognizing unit and a chromaticity value of a piece of white balance information which indicates color features of the colored picture and is extracted in the white balance information extracting means; and a maximum value selecting unit for selecting one relaxation factor having a maximum value from among the relaxation factors calculated in the relaxation factor calculating units as the relaxation factor calculated in the relaxation factor calculating means.

13. An apparatus according to claim 12 in which it is recognized in the histogram type recognizing unit that the color distribution of the colored picture is one-sided in cases where the distribution condition of the hue variables of the hue histogram is one-sided to two hue variables corresponding to two hue regions adjacent to each other or the distribution condition of the hue variables of the hue histogram is one-sided to two hue variables having a complementary color relationship, and a value of the relaxation factor calculated in each of the relaxation factor calculating units in cases where it is recognized in the histogram type recognizing unit that the color distribution of the colored picture is one-sided is higher than that in cases where it is recognized in the histogram type recognizing unit that the color distribution of the colored picture is not one-sided.

14. An apparatus according to claim 12 in which a variable threshold is determined in the histogram type recognizing unit according to the number of picture blocks generated in the white balance information extracting means and the number of hue regions corresponding to hue variables of the hue histogram which each are not zero, and it is recognized in the histogram type recognizing unit that the color distribution of the colored picture is one-sided in cases where the distribution condition of the hue variables of the hue histogram is one-sided to two hue variables which are higher than the variable threshold and correspond to two hue regions adjacent to each other or the distribution condition of the hue variables of the hue histogram is one-sided to two hue variables which are higher than the variable threshold and have a complementary color relationship.

15. An apparatus according to claim 12 in which the white balance information extracted in the white balance information extracting means comprises pieces of block maximum-luminance data WP respectively indicating a color of a maximum-luminance pixel of which a luminance value is the largest among those of pixels in one picture block, pieces of block average color data AVE respectively indicating an average luminance value, an average first color difference value and an average second color difference value of an average pixel among luminance values, first color difference values and second color difference values of pixels in one picture block, a piece of block maximum-luminance average color data WPave indicating an average luminance value, an average first color difference value and an average second color difference value among luminance values, first color difference values and second color difference values of the maximum-luminance pixels, a piece of block average color maximum-luminance data AVEmax indicating an average luminance value, an average first color difference value and an average second color difference value of a particular average pixel of which a luminance value is the largest among the average luminance values of the average pixels and a piece of picture average color data AVEave indicating an average luminance value, an average first color difference value and an average second color difference value among the luminance values, the first color difference values and the second color difference values indicated by the pieces of block average color data AVE, each of the block average color data AVE extracted in the white balance information corresponds to one of the hue regions, each of the hue variables of the hue histogram generated in the hue histogram generating unit designates the number of pieces of block average color data AVE which are extracted in the white balance information extracting means and corresponds to the same hue region, a first relaxation factor of which a value is monotonically increased as a chromaticity value of the block maximum-luminance average color data WPave extracted in the white balance information extracting means is increased is calculated in a first relaxation factor calculating unit of the relaxation factor calculating units, a second relaxation factor of which a value is monotonically increased as a chromaticity value of the block average color maximum-luminance data AVEmax extracted in the white balance information extracting means is increased is calculated in a second relaxation factor calculating unit of the relaxation factor calculating units, a third relaxation factor of which a value is monotonically increased as a chromaticity value of the picture average color data AVEave extracted in the white balance information extracting means is increased is calculated in a third relaxation factor calculating unit of the relaxation factor calculating units, and a relaxation factor having a maximum value among those of the first, second and third relaxation factors is selected in the maximum value selecting unit.

16. An apparatus according to claim 1 in which the white balance coefficient functioning as the amplification gain for the colors of the colored picture is calculated in the white balance-coefficient calculating means according to the color distribution axis detected in the color distribution axis detecting means to place a reproduced gravity center of reproduced colors of the colored picture, which are obtained by amplifying the colors of the colored picture by the white balance coefficient, on an achromatic color axis of the three-dimensional color axis, and the white balance coefficient is decreased in the white balance coefficient calculating means by compressing a variation value of the white balance coefficient from 1.0 according to the relaxation factor calculated in the relaxation factor calculating means.

17. An apparatus according to claim 1 in which the white balance coefficient functioning as the amplification gain for the colors of the colored picture is calculated in the white balance coefficient calculating means according to the color distribution axis detected in the color distribution axis detecting means to place a reproduced gravity center of reproduced colors of the colored picture, which are obtained by amplifying the colors of the colored picture by the white balance coefficient, on an achromatic color axis of the three-dimensional color axis, the white balance coefficient is decreased in the white balance coefficient calculating means by compressing a variation value of the white balance coefficient from one according to the relaxation factor calculated in the relaxation factor calculating means, and the white balance coefficient is again decreased in an allowable range in the white balance coefficient calculating means by compressing a variation value of the white balance coefficient from one in cases where the white balance coefficient decreased according to the relaxation factor is out of the allowable range.

18. An apparatus according to claim 1, further comprising:

white balance adjustment mode setting means for setting a first white balance adjustment mode in cases where a white region having a sufficiently low chromaticity is detected in the white region judging and detecting means, setting a second white balance adjustment mode in cases where any white region having a low chromaticity is not detected in the white region judging and detecting means and setting a third white balance adjustment mode in cases where a white region having a low chromaticity near to white is detected in the white region judging and detecting means, wherein the white balance coefficient is calculated in the white balance coefficient calculating means according to a color of the white region in case of the first white balance adjustment mode, the white balance coefficient is calculated in the white balance coefficient calculating means according to the color distribution axis in case of the second white balance adjustment mode, and the white balance coefficient is calculated in the white balance coefficient calculating means according to a color of the white region and the gravity center indicated by the color distribution axis in case of the third white balance adjustment mode.

19. An apparatus according to claim 18 in which the white balance information extracted in the white balance information extracting means comprises pieces of block maximum-luminance data WP respectively indicating a color of a maximum-luminance pixel of which a luminance value is the largest among those of pixels in one picture block and a piece of picture maximum-luminance data WPmax(WXr, WXg, WXb) indicating three primary colors of a particular maximum-luminance pixel of which a luminance value is the largest among those of maximum-luminance pixels, first, second and third components WBkr, WBkg and WBkb of the white balance coefficient for three primary colors R, G and B of the colored picture are calculated in the white balance coefficient calculating means according to a first equation $$Y=0.3*WXr+0.59*WXg+0.11*WXb$$

$$WBkr=Y/WXr$$

$$WBkg=Y/WXg$$

$$WBkb=Y/WXb$$

in cases where the first white balance adjustment mode is set in the white balance adjustment mode setting means, the components WBkr, WBkg and WBkb of the white balance coefficient are calculated in the white balance coefficient calculating means by using a vector (WBr, WBg, WBb) of the color distribution axis detected in the color distribution axis detecting means according to a second equation $$Y=0.3*WBr+0.59*WBg+0.11*WB$$

$$WBkr=Y/WBr$$

$$WBkg=Y/WBg$$

$$WBkb=Y/WBb$$

in cases where the second white balance adjustment mode is set in the white balance adjustment mode setting means, and the components WBkr, WBkg and WBkb of the white balance coefficient are calculated in the white balance coefficient calculating means by using the vector (WBr, WBg, WBb) of the color distribution axis and the picture maximum-luminance data WPmax(WXr, WXg, WXb) according to a third equation $$Y=0.3*(WBr+WXr)/2+0.59*(WBg+WXg)/2+0.11*(WBb+WXb)/2$$

$$WBkr=Y/(WBr+WXr)*2$$

$$WBkg=Y/(WBg+WXg)*2$$

$$WBkb=Y/(WBb+WXb)*2$$

in cases where the third white balance adjustment mode is set in the white balance adjustment mode setting means.

20. An apparatus according to claim 1, further comprising:

white balance adjustment judging means for judging whether or not a white balance of the colored picture is sufficiently kept and judging whether or not a major portion of the colored picture is occupied by an object having a chromatic color according to the white balance information extracted in the white balance information extracting means, wherein the detection of the white region performed in the white region judging and detecting means and the detection of the color distribution axis performed in the color distribution axis detecting means are stopped in cases where it is judged that a white balance of the colored picture is sufficiently kept or a major portion of the colored picture is occupied by an object having a chromatic color.

21. An apparatus according to claim 20 in which the white balance information extracted in the white balance information extracting means comprises pieces of block maximum-luminance data WP respectively indicating a color of a maximum-luminance pixel of which a luminance value is the largest among those of pixels in one picture block, pieces of block average color data AVE respectively indicating an average luminance value, an average first color difference value and an average second color difference value of an average pixel among luminance values, first color difference values and second color difference values of pixels in one picture block, a piece of picture maximum-luminance data WPmax indicating a color of a particular maximum-luminance pixel of which a luminance value is the largest among those of maximum-luminance pixels, a piece of block maximum-luminance average color data WPave indicating an average luminance value, an average first color difference value and an average second color difference value among luminance values, first color difference values and second color difference values of the maximum-luminance pixels, a piece of block average color maximum-luminance data AVEmax indicating an average luminance value, an average first color difference value and an average second color difference value of a particular average pixel of which a luminance value is the largest among the average luminance values of the average pixels, a piece of picture average color data AVEave indicating an average luminance value, an average first color difference value and an average second color difference value among the luminance values, the first color difference values and the second color difference values indicated by the pieces of block average color data AVE, a piece of squared chromaticity data WXsqc defined as a sum of a squared first color difference value of the picture maximum-luminance data WPmax and a squared second color difference value of the picture maximum-luminance data WPmax, a piece of squared chromaticity data WAsqc defined as a sum of a squared average first color difference value of the block maximum-luminance average color data WPave and a squared average second color difference value of the block maximum-luminance average color data WPave, a piece of squared chromaticity data AXsqc defined as a sum of a squared average first color difference value of the block average color maximum-luminance data AVEmax and a squared average second color difference value of the block average color maximum-luminance data AVEmax and a piece of squared chromaticity data AAsqc defined as a sum of a squared average first color difference value of the picture average color data AVEave and a squared average second color difference value of the picture average color data AVEave, and it is judged in the white balance adjustment judging means that a major portion of the colored picture is occupied by an object having a chromatic color in cases where the squared chromaticity data WAsqc is equal to or higher than a first threshold, the squared chromaticity data AXsqc is equal to or higher than a second threshold and the squared chromaticity data AAsqc is equal to or higher than a third threshold or it is judged in the white balance adjustment judging means that a white balance of the colored picture is sufficiently kept in cases where the squared chromaticity data WXsqc is equal to or lower than a fourth threshold and the squared chromaticity data WAsqc is equal to or lower than a fifth threshold.

* * * * *